United States Patent
Wakabayashi

(10) Patent No.: US 11,509,840 B2
(45) Date of Patent: Nov. 22, 2022

(54) SOLID-STATE IMAGING DEVICE, SIGNAL PROCESSING CHIP, AND ELECTRONIC APPARATUS

(71) Applicant: Sony Semiconductor Solutions Corporation, Kanagawa (JP)

(72) Inventor: Hayato Wakabayashi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/047,564

(22) PCT Filed: Nov. 21, 2019

(86) PCT No.: PCT/JP2019/045614
§ 371 (c)(1),
(2) Date: Oct. 14, 2020

(87) PCT Pub. No.: WO2020/116185
PCT Pub. Date: Jun. 11, 2020

(65) Prior Publication Data
US 2021/0152757 A1    May 20, 2021

(30) Foreign Application Priority Data
Dec. 5, 2018 (JP) .............................. JP2018-227821

(51) Int. Cl.
*H04N 5/343* (2011.01)
*G06V 10/22* (2022.01)
(Continued)

(52) U.S. Cl.
CPC ............ *H04N 5/343* (2013.01); *G06V 10/22* (2022.01); *H04N 5/06* (2013.01); *H04N 5/2258* (2013.01);
(Continued)

(58) Field of Classification Search
CPC ........ H04N 5/343; H04N 5/06; H04N 5/2258; H04N 5/3454; H04N 5/3456; H04N 5/351;
(Continued)

(56) References Cited

U.S. PATENT DOCUMENTS 10,345,447 B1* 7/2019 Hicks ...................... G01S 7/486
2011/0019936 A1* 1/2011 Bhrugumalla ..... H04N 5/23218
382/298
(Continued)

FOREIGN PATENT DOCUMENTS

JP    2017-535999 A    11/2017

*Primary Examiner* — Albert H Cutler
(74) *Attorney, Agent, or Firm* — Michael Best & Friedrich LLP

(57) ABSTRACT

The present technology relates to a solid-state imaging device, a signal processing chip, and an electronic apparatus that make it possible to utilize the result of detecting an occurrence of an event in imaging. The solid-state imaging device includes: an event detection unit that detects, as an event, a change in an electrical signal generated by each pixel of a pixel array unit; a region-of-interest detection unit that detects, from a result of detecting the event, a region-of-interest of the pixel array unit; and a pixel signal generation unit that generates a pixel signal constituting an image of a region corresponding to the region-of-interest. The present technology is applicable to, for example, a sensor that detects an event that is a change in an electrical signal of a pixel.

13 Claims, 31 Drawing Sheets

(51) Int. Cl.
  *H04N 5/06*  (2006.01)
  *H04N 5/225* (2006.01)
  *H04N 5/345* (2011.01)
  *H04N 5/351* (2011.01)
  *H04N 5/369* (2011.01)
  *H04N 5/232* (2006.01)
  *H04N 5/341* (2011.01)

(52) U.S. Cl.
  CPC ......... *H04N 5/3454* (2013.01); *H04N 5/3456* (2013.01); *H04N 5/351* (2013.01); *H04N 5/379* (2018.08)

(58) Field of Classification Search
  CPC ............... H04N 5/379; H04N 5/23218; H04N 5/23227; H04N 5/23293; H04N 5/341; H04N 9/09; H04N 2209/048; H04N 2209/049; G06K 9/2054

USPC .......................................... 348/262–265, 350
  See application file for complete search history.

(56) References Cited

U.S. PATENT DOCUMENTS

| | | | | |
|---|---|---|---|---|
| 2012/0257789 | A1* | 10/2012 | Lee ......................... | G06F 3/005 |
| | | | | 382/103 |
| 2014/0009648 | A1* | 1/2014 | Kim ..................... | H04N 5/3696 |
| | | | | 348/272 |
| 2014/0368712 | A1* | 12/2014 | Park ..................... | H04N 5/2258 |
| | | | | 348/308 |
| 2018/0160110 | A1* | 6/2018 | Koesters .............. | H04N 17/002 |
| 2018/0167575 | A1* | 6/2018 | Watanabe .............. | H04N 5/378 |
| 2018/0262705 | A1* | 9/2018 | Park ..................... | G06F 16/2322 |
| 2019/0174080 | A1* | 6/2019 | Kaibara ................ | H04N 5/357 |
| 2020/0084403 | A1* | 3/2020 | Suh ....................... | H04N 5/3745 |
| 2021/0350145 | A1* | 11/2021 | Park .................. | B60W 60/0027 |

* cited by examiner

SOLID-STATE IMAGING DEVICE, SIGNAL PROCESSING CHIP, AND ELECTRONIC APPARATUS

TECHNICAL FIELD

The present technology relates to a solid-state imaging device, a signal processing chip, and an electronic apparatus, and particularly to a solid-state imaging device, a signal processing chip, and an electronic apparatus that make it possible to utilize the result of detecting an occurrence of an event in imaging.

BACKGROUND ART

An image sensor that outputs, in the case where an event has occurred, event data representing an occurrence of the event by using the change in brightness of a pixel as an event has been proposed (see, for example, Patent Literature 1).

Here, an image sensor that performs imaging in synchronization with a vertical synchronization signal and outputs frame data in a raster-scan format can be called a synchronous image sensor. Meanwhile, an image sensor that outputs event data can be called an asynchronous image sensor because the image sensor reads a pixel where event data has occurred at any time. The asynchronous image sensor is called a DVS (Dynamic Vision Sensor), for example.

CITATION LIST

Patent Literature

Patent Literature 1: Japanese Unexamined Patent Application Publication No. 2017-535999

DISCLOSURE OF INVENTION

Technical Problem

A method of utilizing, in imaging, a result of detecting an occurrence of an event by the asynchronous image sensor is desired.

The present technology has been made in view of the above-mentioned circumstances and it is an object thereof to make it possible to utilize the result of detecting an occurrence of an event in imaging.

Solution to Problem

A solid-state imaging device according to a first aspect of the present technology includes: an event detection unit that detects, as an event, a change in an electrical signal generated by each pixel of a pixel array unit; a region-of-interest detection unit that detects, from a result of detecting the event, a region-of-interest of the pixel array unit; and a pixel signal generation unit that generates a pixel signal constituting an image of a region corresponding to the region-of-interest.

A signal processing chip a second aspect of the present technology includes: a region-of-interest detection unit that detects, from a result of detecting, as an event, a change in an electrical signal generated by each pixel of a pixel array unit, a region-of-interest of the pixel array unit, and outputs ROI information for identifying the region-of-interest; and an image processing unit that acquires a pixel signal of the region-of-interest and generates an image.

An electronic apparatus according to a third aspect of the present technology includes: a solid-state imaging device including an event detection unit that detects, as an event, a change in an electrical signal generated by each pixel of a pixel array unit, a region-of-interest detection unit that detects, from a result of detecting the event, a region-of-interest of the pixel array unit, and a pixel signal generation unit that generates a pixel signal constituting an image of a region corresponding to the region-of-interest.

In the first and third aspects of the present technology, a change in an electrical signal generated by each pixel of a pixel array unit is detected as an event, a region-of-interest of the pixel array unit is detected from a result of detecting the event, and a pixel signal constituting an image of a region corresponding to the region-of-interest is generated.

In the second aspect of the present technology, a region-of-interest of the pixel array unit is detected from a detection result of detecting, as an event, a change in an electrical signal generated by each pixel of a pixel array unit, ROI information for identifying the region-of-interest is output, and a pixel signal of the region-of-interest is acquired to generate an image.

The solid-state imaging device, the signal processing chip, and the electronic apparatus may be separate devices or may be modules incorporated into other devices.

MODE(S) FOR CARRYING OUT THE INVENTION

Hereinafter, embodiments for carrying out the present technology (hereinafter, referred to as embodiments) will be described. Note that description will be made in the following order.
1. First embodiment (solid-state imaging device having two-chip configuration)
2. Second embodiment (solid-state imaging device having three-chip configuration)
3. Third embodiment (solid-state imaging device having three-chip configuration)
4. Fourth embodiment (solid-state imaging device having one-chip configuration)
5. Application Example to electronic apparatus
6. Application Example to moving object

1. First Embodiment

Figure 1:
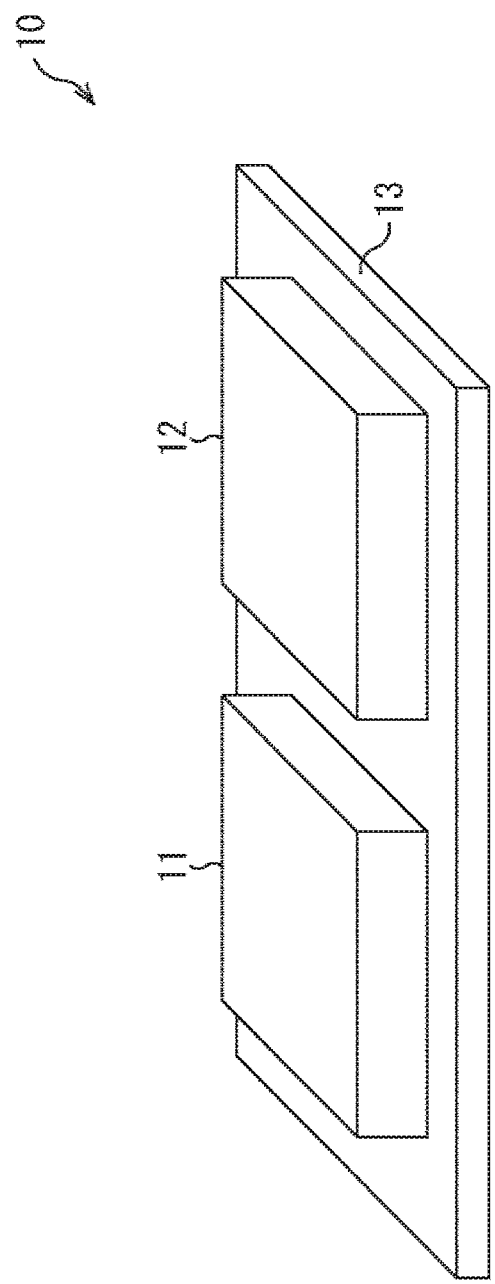
FIG. 1 is a diagram showing a configuration example of a first embodiment of a solid-state imaging device to which the present technology is applied.

FIG. 1 is a diagram showing a configuration example of a first embodiment of a solid-state imaging device to which the present technology is applied.

A solid-state imaging device 10 in FIG. 1 includes a first chip 11, a second chip 12, and a relay board (interposer board) 13 on which the first chip 11 and the second chip 12 are mounted.

The first chip 11 is an image sensor chip that outputs, in the case where an event has occurred, event data representing an occurrence of the event by using the change in brightness of a pixel as an event. The first chip 11 performs photoelectric conversion of incident light to perform imaging in which an electrical signal is generated. The imaging is performed in synchronization with a vertical synchronization signal, and event data representing an occurrence of an event that is a change in an electrical signal of a pixel is generated instead of generating image data in a frame format (frame data).

Meanwhile, the second chip 12 is an image sensor that performs imaging in synchronization with a vertical synchronization signal and outputs frame data that is image data in a frame format.

Since the first chip 11 does not output event data in synchronization with a vertical synchronization signal, the first chip 11 can be called an asynchronous image sensor. The asynchronous image sensor is also called a DVS (Dynamic Vision Sensor), for example. In the following, the first chip 11 will be referred to as the DVS chip 11 and the second chip 12 will be referred to as the CIS chip 12 in order to facilitate differentiation.

The relay board 13 includes a signal wiring for relaying signals between the DVS chip 11 and the CIS chip 12, and an output terminal that outputs an output signal of the solid-state imaging device 10 to the outside. The output terminal includes, for example, a solder ball formed on the side opposite to the mounting surface of the DVS chip 11 and the CIS chip 12.

The DVS chip 11 detects an event that occurs within a predetermined detection target range, i.e., a change in brightness of a pixel, determines, on the basis of the detected event, a region-of-interest that is a region of particular interest within the detection target range, and outputs the region-of-interest to the CIS chip 12.

The CIS chip 12 performs imaging on the region-of-interest determined by the DVS chip 11 in the predetermined imaging target range, and outputs a captured image obtained as a result of the imaging to the outside.

Here, the detection target range of the DVS chip 11 and the imaging target range of the CIS chip 12 coincide with each other by performing calibration in advance. In other words, imaging can be performed by the CIS chip 12 in all the detection target ranges of the DVS chip 11. Further, in this embodiment, assumption is made that pixels of the DVS chip 11 and pixels of the CIS chip 12 correspond to each other in a one-to-one manner for simplicity, but the pixels are not necessarily required to correspond to each other in a one-to-one manner. For example, the pixels may have a relationship that one pixel corresponds to the other N pixels (N>1).

<Configuration Example of DVS Chip 11>

Figure 2:
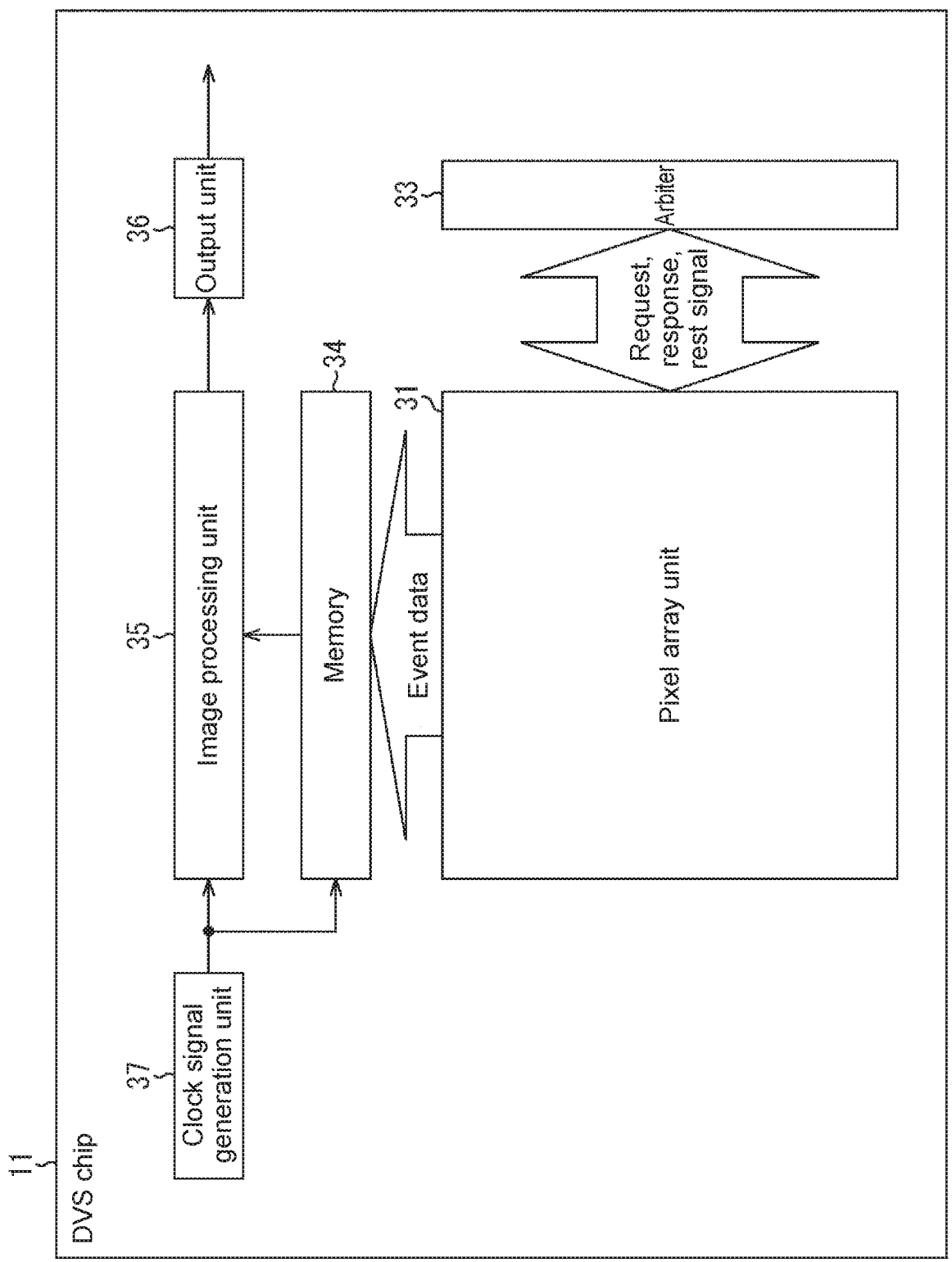
FIG. 2 is a block diagram showing a configuration example of a DVS chip in FIG. 1.

FIG. 2 is a block diagram showing a configuration example of the DVS chip 11 in FIG. 1.

The DVS chip 11 includes a pixel array unit 31, an arbiter 33, a memory 34, an image processing unit 35, an output unit 36, and a clock signal generation unit 37.

The pixel array unit 31 is configured by arranging a plurality of pixels 51 (FIG. 3) in a two-dimensional lattice. In addition, the pixel array unit 31 is divided into a plurality of pixel blocks 41 (FIG. 3) each including a predetermined number of pixels 51. In the case where a change exceeding a predetermined threshold value (including a change equal to or greater than the threshold value as necessary) occurs in (a voltage corresponding to) a photocurrent as an electrical signal generated by photoelectric conversion of the pixel 51, the pixel array unit 31 detects the change in the photocurrent as an event. In the case where the pixel array unit 31 detects an event, the pixel array unit 31 outputs a request for outputting event data representing an occurrence of an event to the arbiter 33. Then, in the case where the pixel array unit 31 receives a response representing permission to output event data from the arbiter 33, the pixel array unit 31 outputs event data to the memory 34.

Here, since the change in a photocurrent generated by the pixel 51 can also be regarded as a change in the amount of light entering the pixel 51, an event can also be said to be the change in the amount of light of the pixel 51 (change in the amount of light exceeding the threshold value).

The arbiter 33 arbitrates for a request from the pixel block 41 constituting the pixel array unit 31, and returns a response representing whether to permit or not to permit the outputting of event data to the pixel array unit 31. Further, the arbiter 33 outputs a response representing the permission of event data output, and then outputs a reset signal for resetting the event detection to the pixel array unit 31.

The memory 34 accumulates event data from the pixel array unit 31 in predetermined frame units (frame volume described below). The frame unit in which the memory 34 accumulates event data from the pixel array unit 31 is controlled by the image processing unit 35. On the basis of a clock signal supplied by the clock signal generation unit 37, the memory 34 adds a count value serving as time information representing the (relative) time at which an event has occurred to event data, and accumulates the obtained data. That is, the memory 34 stores event data including at least position coordinates (e.g., coordinates) representing the position of the pixel block 41 or the pixel 51 at which the event has occurred and time information representing the time at which the event has occurred. In addition, event data may include the polarity (positive and negative) of the change in the amount of light.

The image processing unit 35 performs data processing (image processing) in accordance with event data (frame data) in units of frames accumulated in the memory 34, and outputs the data processing result that is the result of the data processing. For example, the image processing unit 35 extracts contour information of an object from event data in units of frames, and identifies the object to be detected. The image processing unit 35 determines a region-of-interest including the identified object and outputs the region-of-interest to the output unit 36.

The output unit 36 outputs, as ROI information (Region Of Interest), information for identifying the region-of-interest from the image processing unit 35 to the CIS chip 12 via the relay board 13.

The clock signal generation unit 37 generates a clock signal to be used as a master clock, and supplies the clock signal to the memory 34, the image processing unit 35, and the like.

<Configuration Example of Pixel Array Unit 31>

Figure 3:
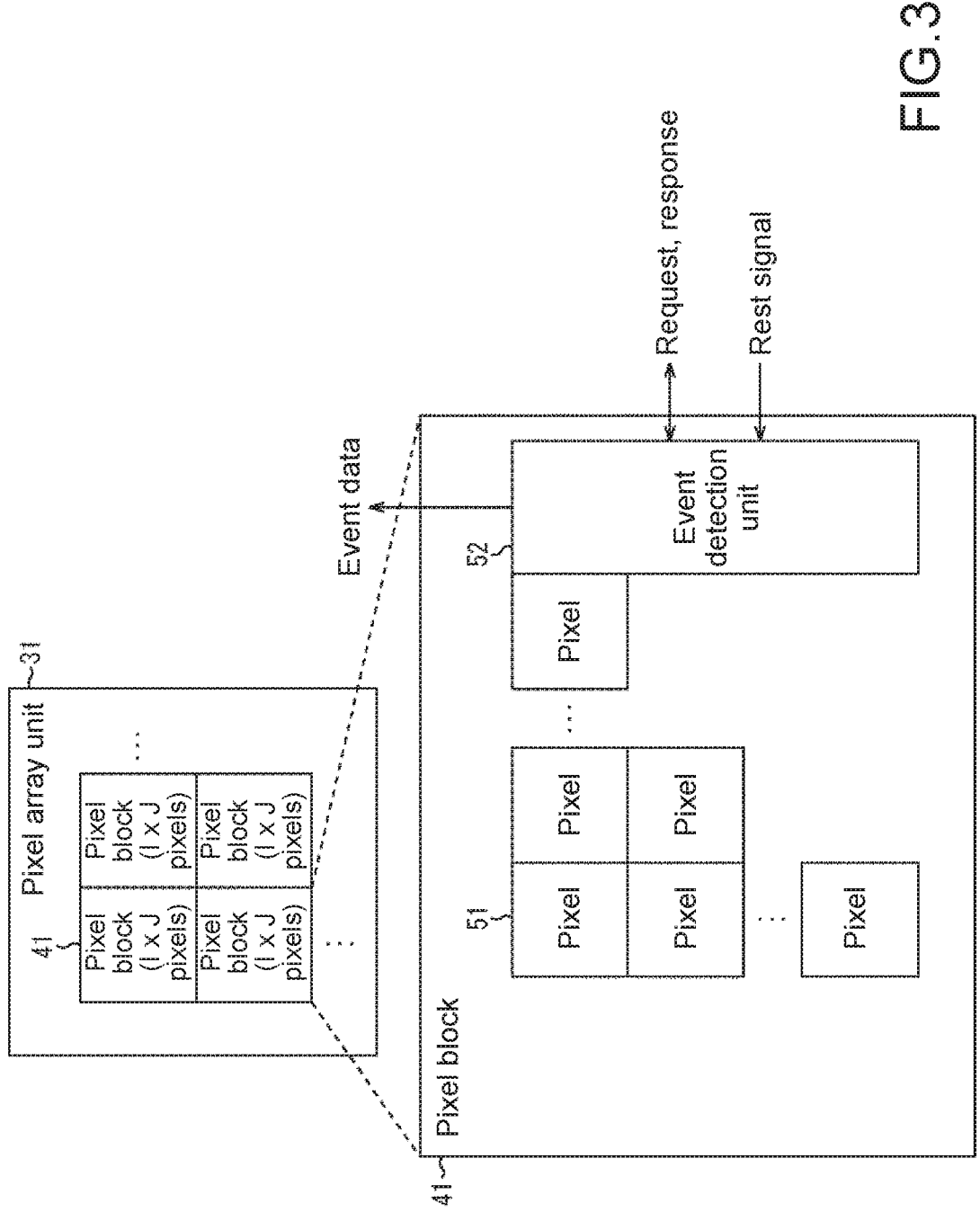
FIG. 3 is a block diagram showing a configuration example of a pixel array unit in FIG. 2.

FIG. 3 is a block diagram showing a configuration example of the pixel array unit 31 in FIG. 2.

The pixel array unit 31 includes the plurality of pixel block 41. The pixel block 41 includes one or more I×J pixels 51 arranged in I row×J column (I and J are integers), and an event detection unit 52. The one or more pixels 51 in the pixel block 41 share the event detection unit 52.

The pixel 51 receives incident light from an object and photoelectrically converts the light to generate a photocurrent as an electrical signal. The pixel 51 supplies the generated photocurrent to the event detection unit 52.

After performing resetting by a reset signal from the arbiter 33, the event detection unit 52 detects, as an event, a change in a photocurrent from each of the pixels 51 exceeding a predetermined threshold value. When the event detection unit 52 detects an event, the event detection unit 52 supplies a request for outputting event data representing an occurrence of an event to the arbiter 33 (FIG. 2). Then, when the event detection unit 52 receives a response permitting the output of event data in response to the request from the arbiter 33, the event detection unit 52 outputs event data to the memory 34.

Here, detecting a change exceeding a predetermined threshold value of a photocurrent as an event can be also regarded as detecting, as an event, that there has been no change exceeding the predetermined threshold value of a photocurrent.

<Configuration Example of Pixel Block 41>

Figure 4:
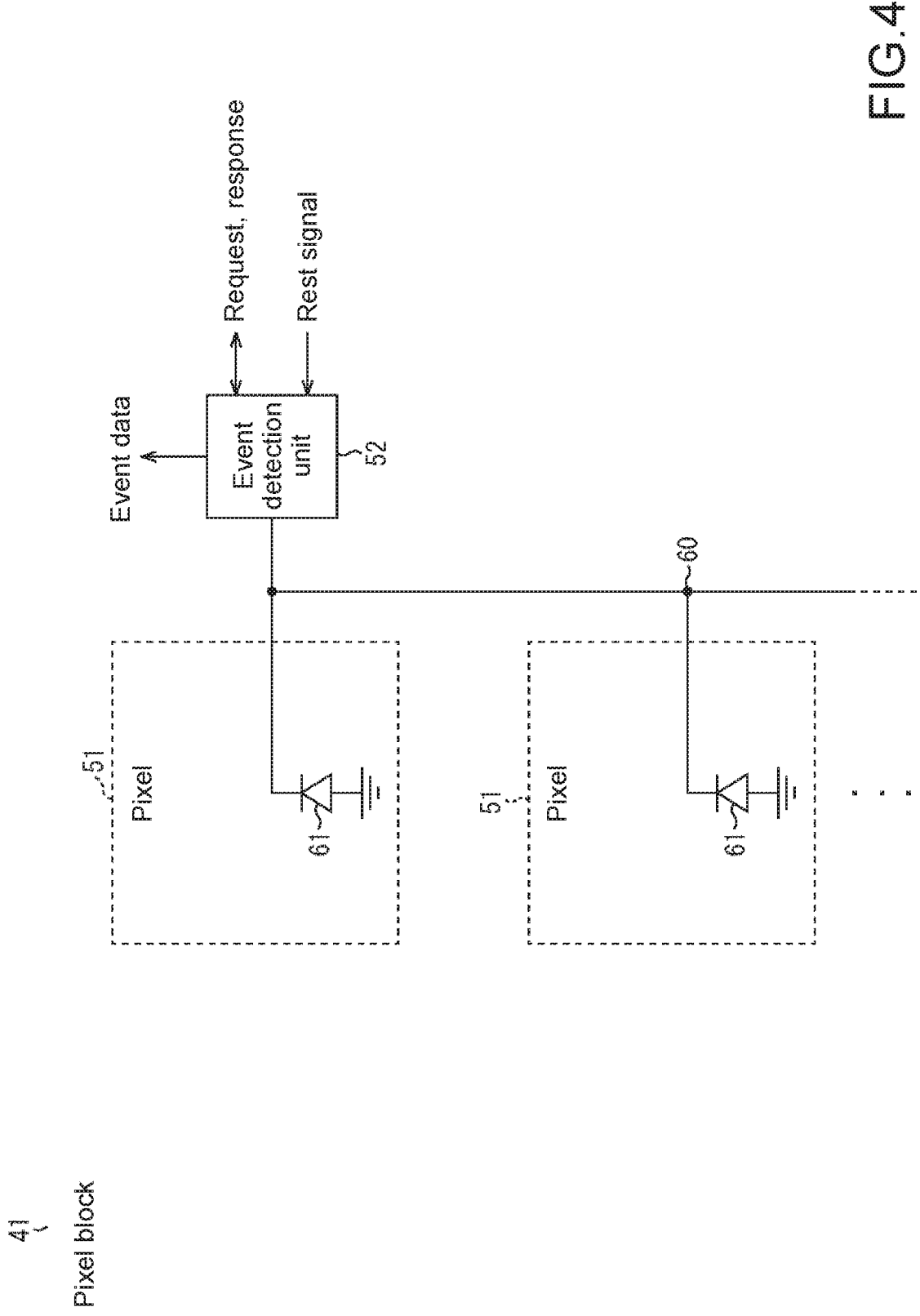
FIG. 4 is a circuit diagram showing a configuration example of a pixel block in FIG. 3.

FIG. 4 is a circuit diagram showing a configuration example of the pixel block 41 in FIG. 3.

As shown in FIG. 3, the pixel block 41 includes the one or more pixels 51 and the event detection unit 52.

The pixel 51 includes a photoelectric conversion element 61. The photoelectric conversion element 61 includes, for example, a PD (Photodiode), receives incident light, and photoelectrically converts the light to generate charges.

The I×J pixels 51 constituting the pixel block 41 are connected to the event detection unit 52 constituting the pixel block 41 via a node 60. Thus, a photocurrent generated by (the photoelectric conversion element 61 of) the pixel 51 is supplied to the event detection unit 52 via the node 60. As a result, the event detection unit 52 is supplied with the sum of photocurrents of all the pixels 51 in the pixel block 41. Therefore, in the event detection unit 52, the change in the sum of photocurrents supplied from the I×J pixels 51 constituting the pixel block 41 is detected as an event.

In the pixel array unit 31 in FIG. 3, the pixel block 41 includes the one or more pixels 51 and the event detection unit 52 is shared by the one or more pixels 51. Therefore, in the case where the pixel block 41 includes the plurality of pixels 51, the number of the event detection units 52 can be reduced and the size of the pixel array unit 31 can be suppressed as compared with the case where one event detection unit 52 is provided for one pixel 51.

Note that in the case where the pixel block 41 includes the plurality of pixels 51, the event detection unit 52 can be provided for each pixel 51. In the case where the event detection unit 52 is shared by the plurality of pixels 51 of the pixel block 41, an event is detected in units of the pixel blocks 41. Meanwhile, in the case where the event detection unit 52 is provided for each pixel 51, an event can be detected in units of the pixels 51.

<Configuration Example of Event Detection Unit 52>

Figure 5:
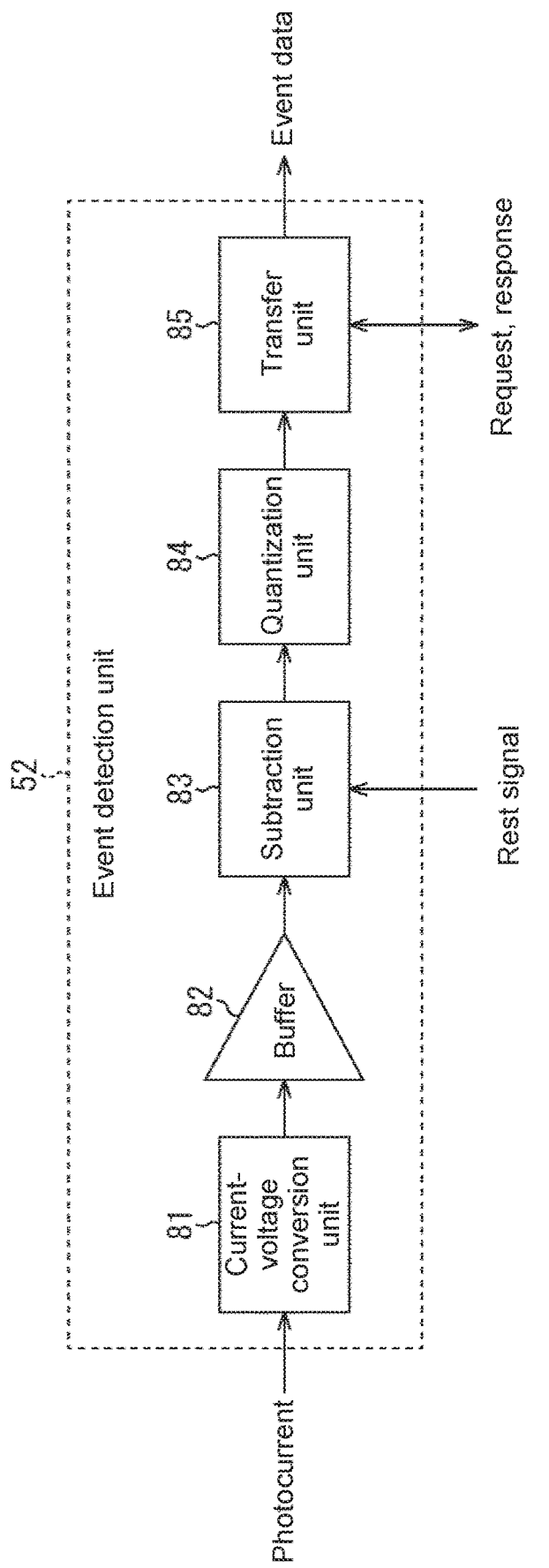
FIG. 5 is a block diagram showing a configuration example of an event detection unit.

FIG. 5 is a block diagram showing a configuration example of the event detection unit 52 in FIG. 3.

The event detection unit 52 includes a current-voltage conversion unit 81, a buffer 82, a subtraction unit 83, a quantization unit 84, and a transfer unit 85.

The current-voltage conversion unit 81 converts (the sum of) photocurrents from the pixels 51 into a voltage (hereinafter, referred to also as a photovoltage) corresponding to the logarithm of the photocurrents and supplies the voltage to the buffer 82.

The buffer 82 buffers the photovoltage from the current-voltage conversion unit 81 and supplies the buffered photovoltage to the subtraction unit 83.

The subtraction unit 83 calculates, at a timing according to the reset signal from the arbiter 33, the difference between the present photovoltage and the photovoltage at the timing different by a minute time from the present time, and supplies the difference signal corresponding to the difference to the quantization unit 84.

The quantization unit 84 quantizes the difference signal from the subtraction unit 83 into a digital signal, and supplies the quantized value of the difference signal to the transfer unit 85 as event data.

In accordance with the event data from the quantization unit 84, the transfer unit 85 transfers (outputs) the event data to the memory 34. That is, the transfer unit 85 supplies a request for outputting the event data to the arbiter 33. Then, when the transfer unit 85 receives, from the arbiter 33, a response permitting the output of event data in response to the request, the transfer unit 85 outputs the event data to the memory 34.

<Configuration Example of Current-Voltage Conversion Unit 81>

Figure 6:
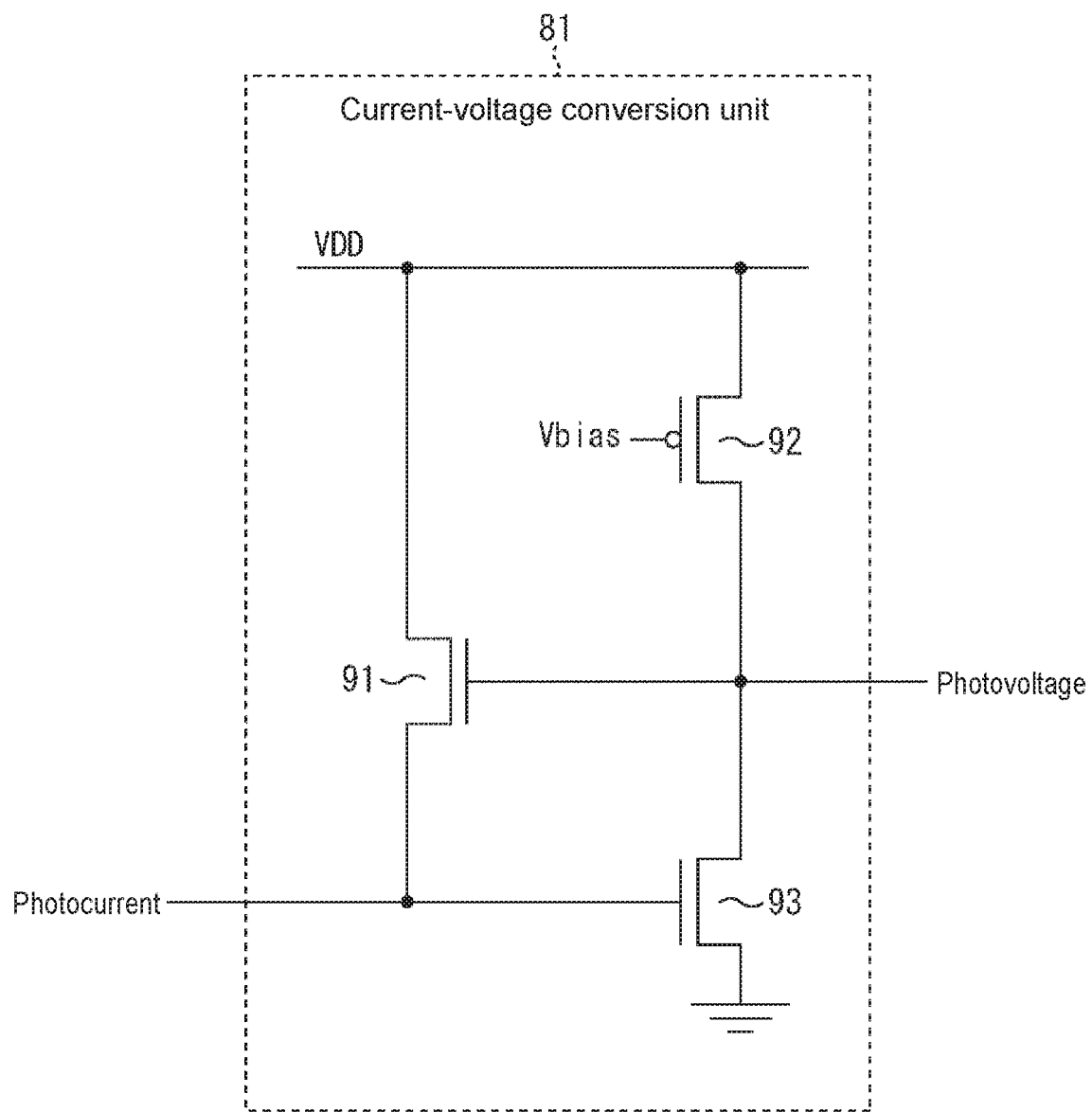
FIG. 6 is a circuit diagram showing a configuration example of a current-voltage conversion unit.

FIG. 6 is a circuit diagram showing a configuration example of the current-voltage conversion unit 81 in FIG. 5.

The current-voltage conversion unit 81 includes transistors 91 to 93. For example, an N-type MOS FET can be used as the transistors 91 and 93, and a P-type MOS FET can be used as the transistor 92.

The sauce of the transistor 91 is connected to the gate of the transistor 93, and a photocurrent from the pixel 51 is supplied to the connection point between the sauce of the transistor 91 and the gate of the transistor 93. The drain of the transistor 91 is connected to a power source VDD, and the gate thereof is connected to the drain of the transistor 93.

The source of the transistor 92 is connected to the power source VDD, and the drain thereof is connected to the connection point of the gate of the transistor 91 and the drain of the transistor 93. A predetermined biasing-voltage Vbias is applied to the gate of the transistor 92. The transistor 92 is turned on/off by the biasing-voltage Vbias, and the operation of the current-voltage conversion unit 81 is also turned on/off by turning on/off the transistor 92.

The source of the transistor 93 is grounded.

In the current-voltage conversion unit 81, the drain of the transistor 91 is connected to the power source VDD side and serves as a source follower. The pixel 51 (FIG. 4) is connected to the source of the transistor 91 that is a source follower. As a result, a photocurrent flows due to the charges generated by the photoelectric conversion element 61 of the pixel 51 to (the source from the drain of) the transistor 91. The transistor 91 operates in the sub-threshold region, and a photovoltage corresponding to the logarithm of the photo-current flowing to the transistor 91 appears at the gate of the transistor 91. As described above, in the current-voltage conversion unit 81, the transistor 91 converts a photocurrent from the pixel 51 into a photovoltage corresponding to the logarithm of the photocurrent.

In the current-voltage conversion unit 81, the gate of the transistor 91 is connected to the connection point between the drain of the transistor 92 and the drain of the transistor 93, and the photovoltage is output from the connection point.

<Configuration Example of Subtraction Unit 83 and Quantization Unit 84>

Figure 7:
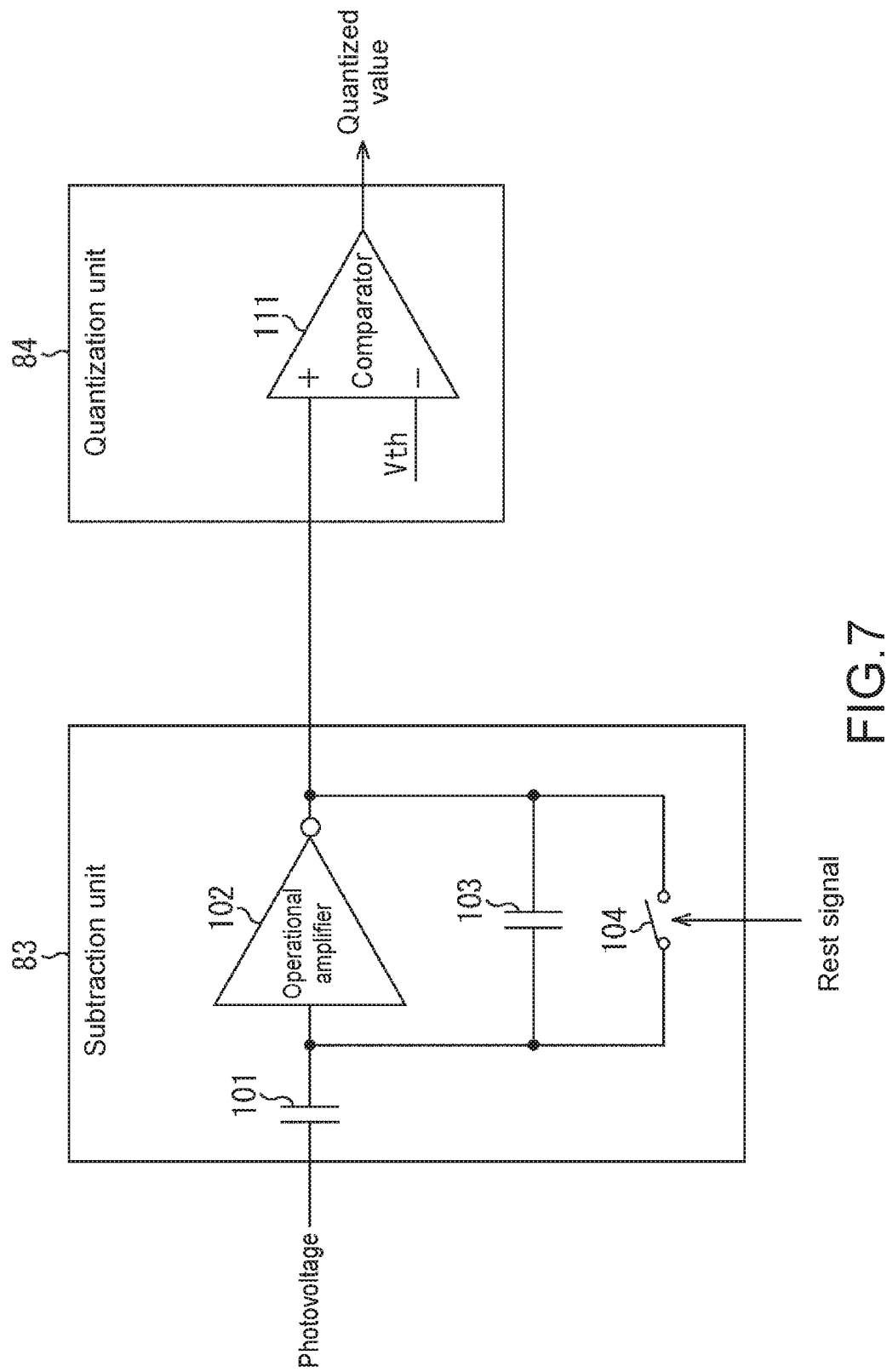
FIG. 7 is a circuit diagram showing a configuration example of a subtraction unit and a quantization unit.

FIG. 7 is a circuit diagram showing a configuration example of the subtraction unit 83 and the quantization unit 84 in FIG. 5.

The subtraction unit 83 includes a capacitor 101, an operational amplifier 102, a capacitor 103, and a switch 104. The quantization unit 84 includes a comparator 111.

One end of the capacitor 101 is connected to the output terminal of the buffer 82 (FIG. 5), and the other end is connected to the input terminal (inverting input terminal) of the operational amplifier 102. Therefore, the photovoltage is input to the input terminal of the operational amplifier 102 via the capacitor 101.

The output terminal of the operational amplifier 102 is connected to the non-inverting input terminal (+) of the comparator 111.

One end of the capacitor 103 is connected to the input terminal of the operational amplifier 102, and the other end is connected to the output terminal of the operational amplifier 102.

The switch 104 is connected to the capacitor 103 so that connections of both ends of the capacitor 103 are turned on/off. The switch 104 turns on/off the connections of both ends of the capacitor 103 by being turned on/off in accordance with the reset signal.

The photovoltage on the buffer 82 (FIG. 5) side of the capacitor 101 when the switch 104 is turned on is denoted by Vinit and the capacitance (electrostatic capacitance) of the capacitor 101 is denoted by C1. The input terminal of the operational amplifier 102 is a virtual ground, and a charge Qinit accumulated in the capacitor 101 when the switch 104 is on is expressed by the formula (1).

$$Q\text{init} = C1 \times V\text{init} \tag{1}$$

Further, in the case where the switch 104 is on, the connections of both ends of the capacitor 103 are turned off (short-circuited), so that the charges accumulated in the capacitor 103 are null.

A charge Qafter accumulated in the capacitor 101 when the switch 104 is turned off is expressed by the formula (2), Vafter representing the photovoltage on the side the buffer 82 (FIG. 5) of the capacitor 101 when the switch 104 is subsequently turned off.

$$Q\text{after} = C1 \times V\text{after} \tag{2}$$

When the capacitance of the capacitor 103 is denoted by C2 and the output voltage of the operational amplifier 102 is denoted by Vout, a charge Q2 accumulated in the capacitor 103 is expressed by the formula (3).

$$Q2 = -C2 \times V\text{out} \tag{3}$$

Since the total charge amount obtained by combining charges of the capacitor 101 and charges of the capacitor 103 does not change before and after the switch 104 is turned off, the formula (4) is satisfied.

$$Q\text{init} = Q\text{after} + Q2 \tag{4}$$

Substituting the formulae (1) to (3) into the formula (4) yields the formula (5).

$$V\text{out} = -(C1/C2) \times (V\text{after} - V\text{init}) \tag{5}$$

In accordance with the formula (5), in the subtraction unit 83, subtraction of the photovoltages Vafter and Vinit, i.e., the calculation of the difference signal (Vout) corresponding to the difference Vafter−Vinit between the photovoltages Vafter and Vinit is performed. In accordance with the formula (5), the gain of subtraction of the subtraction unit 83 is C1/C2. Since it is usually desired to maximize the gain, it is favorable to design C1 to be large and C2 to be small. Meanwhile, if C2 is too small, there is a possibility that kTC noise increases and noise characteristics deteriorate. Therefore, the capacitance reduction of C2 is limited to the range in which noise is permitted. Further, since the event detection unit 52 including the subtraction unit 83 is mounted for each pixel block 41, the capacitances C1 and C2 are limited in terms of area. In consideration of these, the values of the capacitances C1 and C2 are determined.

The comparator 111 quantizes the difference signal by comparing the difference signal from the subtraction unit 83 with a predetermined threshold value (voltage) Vth (>0) applied to the inverting input terminal (−), and outputs the quantized value obtained by the quantization to the transfer unit 85 as event data.

For example, the comparator 111 outputs an H (High) level representing 1 as event data representing an occurrence of an event in the case where the difference signal exceeds a threshold value Vth, and outputs an L (low) level representing 0 as event data representing that no event has occurred in the case where the difference signal does not exceed the threshold value Vth.

In accordance with the event data from the quantization unit 84, the transfer unit 85 supplies a request to the arbiter 33 in the case where it is recognized that a change in the amount of light as an event has occurred, i.e., in the case where the difference signal (Vout) is larger than the threshold value Vth, and outputs event data (e.g., the H level) representing an occurrence of an event to the memory 34 after receiving a response indicating permission of event data output.

The memory 34 stores event data from the transfer unit 85, including position information of (the pixel block 41 including) the pixel 51 where the event represented by the event data has occurred, time information representing the time at which the event has occurred, and the polarity of the change in the amount of light as the event, as necessary.

For example, a data format called AER (Address Event Representation) can be adopted as the data format of event data including the position information of the pixel 51 where the event has occurred, the time information representing the time at which the event has occurred, and the polarity of the change in the amount of light as the event.

Note that a gain A of the entire event detection unit 52 is expressed by the following formula when the gain of the current-voltage conversion unit 81 is denoted by $CG_{log}$, the gain of the buffer 82 is denoted by 1, and the gain of the quantization unit 84 is denoted by G, $$A = CG_{log} \cdot C1/C2 \cdot G(\Sigma i_{photo\_n}) \quad (6)$$

$I_{photo\_n}$ represents a photocurrent of the n-th pixel 51 of the I×J pixels 51 constituting the pixel block 41. E in the formula (6) represents a summation in which n is changed to an integer from 1 to I×J.

Note that in the pixel 51, arbitrary light can be received as incident light by, for example, providing an optical filter through which predetermined light is transmitted such as a color filter. For example, in the case where the pixel 51 receives visible light as incident light, event data represents the occurrence of a change in a pixel value in an image in which a viewable object is displayed. Further, for example, in the pixel 51, in the case of receiving infrared rays, millimeter waves, or the like for range-finding as incident light, event data represents the occurrence of a change in the distance to the object. Further, for example, in the pixel 51, in the case of receiving infrared rays for measuring temperatures as incident light, event data represents the occurrence of a change in the temperature of the object. In this embodiment, in the pixel 51, visible light is received as incident light.

<Another Configuration Example of Quantization Unit 84>

Figure 8:
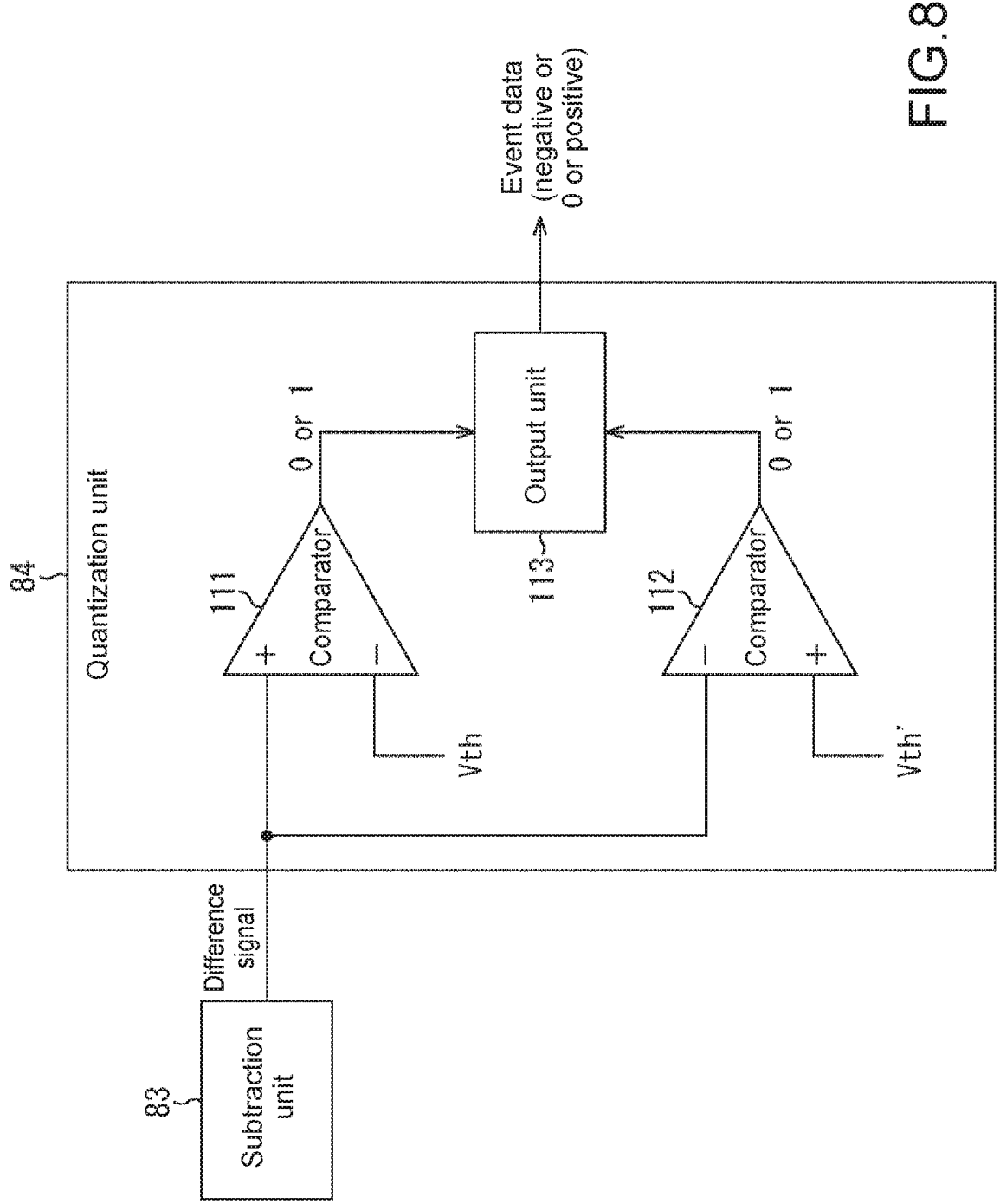
FIG. 8 is a block diagram showing another configuration example of the quantization unit.

FIG. 8 is a block diagram showing another configuration example of the quantization unit 84 in FIG. 5.

Note that in FIG. 8, components corresponding to those in FIG. 7 will be denoted by the same reference symbols, and description thereof will be omitted below.

In FIG. 8, the quantization unit 84 includes the comparator 111, a comparator 112, and an output 113.

Therefore, the quantization unit 84 in FIG. 8 is the same as that in FIG. 7 in that the quantization unit 84 includes the comparator 111. However, the quantization unit 84 in FIG. 8 is different from that in FIG. 7 in that the quantization unit 84 newly includes the comparator 112 and the output 113.

In the event detection unit 52 (FIG. 5) including the quantization unit 84 of FIG. 8, the polarity of the change in the amount of light is also detected as an event in addition to the event.

In the quantization unit 84 in FIG. 8, the comparator 111 outputs, in the case where the difference signal exceeds the threshold value Vth, the H level representing 1 as event data representing an occurrence of an event of the positive polarity, and outputs, in the case where the difference signal does not exceed the threshold value Vth, the L level representing 0 as event data representing that the event of the positive polarity has not occurred.

Further, in the quantization unit 84 in FIG. 8, a threshold value Vth' (<Vth) is supplied to the non-inverting input terminal (+) of the comparator 112, and the difference signal from the subtraction unit 83 is supplied to the inverting input terminal (−) of the comparator 112. Here, assumption is made that the threshold value Vth' is assumed to be equal to, for example, −Vth, for simplicity of description.

The comparator 112 quantizes the difference signal by comparing the difference signal from the subtraction unit 83 with the threshold value Vth' applied to the inverting input terminal (−), and outputs the quantized value obtained by the quantization as event data.

For example, the comparator 112 outputs, in the case where the difference signal is smaller than the threshold value Vth' (in the case where the absolute value of the negative difference signal exceeds the threshold value Vth), the H level representing 1 as event data representing an occurrence of an event of the negative polarity. Further, the comparator 112 outputs, in the case where the difference signal is not smaller than the threshold value Vth' (in the case where the absolute value of the negative difference signal does not exceed the threshold value Vth), the L level representing 0 as event data representing that an event of the negative polarity has not occurred.

The output 113 outputs, to the transfer unit 85, event data representing an occurrence of an event of the positive polarity, event data representing an occurrence of an event of the negative polarity, or event data representing that an event has not occurred, in accordance with the event data output by the comparators 111 and 112.

For example, the output 113 outputs, in the case where the event data from the comparator 111 is the H level representing 1, an H pulse representing +1 to the transfer unit 85 as event data representing an occurrence of an event of the positive polarity. Further, the output 113 outputs, in the case where the event data from the comparator 112 is the H level representing 1, an L pulse representing −1 to the transfer unit 85 as event data representing an occurrence of an event of the negative polarity. Further, the output 113 outputs, in the case where the pieces of event data from the comparators 111 and 112 are both the L level representing 0, a 0 volt (GND level) representing 0 to the transfer unit 85 as event data representing that an event has not occurred.

In accordance with the event data from the output 113 of the quantization unit 84, the transfer unit 85 supplies, in the case where it is recognized that a change in the amount of light as an event of the positive or negative polarity has occurred, a request to the arbiter 33, and outputs event data (the H pulse representing 1 or L pulse representing −1) representing an occurrence of an event of the positive polarity or the negative polarity to the memory 34 after receiving a response representing the permission of event data output.

In the case where the quantization unit 84 is configured as shown in FIG. 7, an occurrence of an event is output in 1-bit (0 or 1) of only the positive polarity. In the case where the quantization unit 84 is configured as shown in FIG. 8, an occurrence of an event is output in 1.5 bits (1, 0, or −1). In the following, the quantization unit 84 is configured as shown in, for example, FIG. 8, of FIG. 7 and FIG. 8.

<Configuration Example of Image Processing Unit 35>

Figure 9:
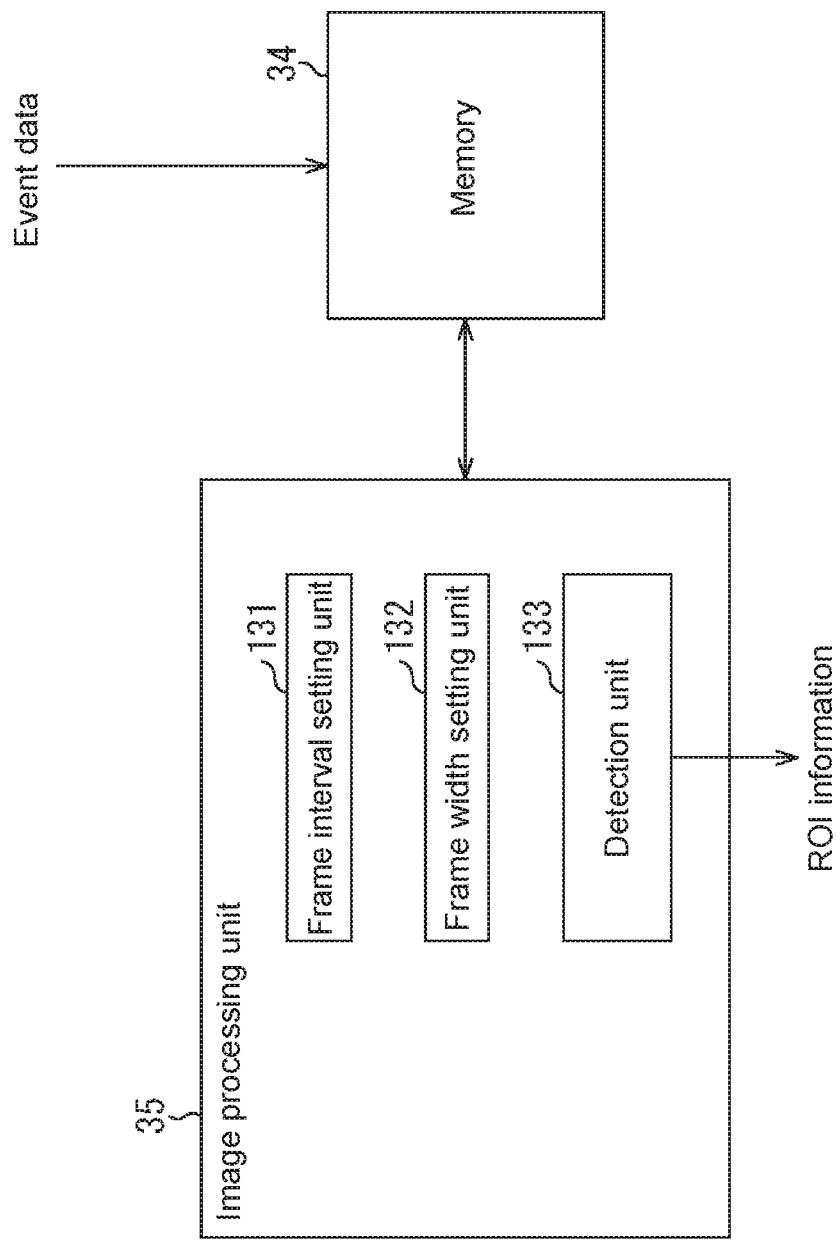
FIG. 9 is a block diagram showing a configuration example of an image processing unit.

FIG. 9 is a block diagram showing a configuration example of the image processing unit 35 in FIG. 2.

In FIG. 9, the image processing unit 35 includes a frame interval setting unit 131, a frame width setting unit 132, and a detection unit (region-of-interest detection unit) 133.

The frame interval setting unit 131 sets, in accordance with, for example, the operation of user, the frame interval, and supplies the set frame interval to the memory 34. The frame interval represents the interval between frames of frame data generated in accordance with event data, and the frame interval can be specified and set by the time or the number of pieces of event data. Here, the frame interval set by the frame interval setting unit 131 is also referred to as the set frame interval.

The frame width setting unit 132 sets the frame width in accordance with, for example, a user operation and supplies the set frame width to the memory 34. The frame width represents the time width of event data used to generate a single frame of frame data, and the frame width can be specified and set by the time or the number of pieces of event data similarly to the frame interval. Here, the frame width set by the frame width setting unit 132 is also referred to as a set frame width.

The memory 34 converts event data from the pixel array unit 31 into frame data in units of fames by generating frame data that is image data in the frame format with the set frame interval and the set frame width set in the frame interval setting unit 131 and the frame width setting unit 132, and stores the converted data.

The detection unit 133 identifies an object to be detected and extracts the contour information of the object by image processing using frame data stored in the memory 34, for example, image recognition using pattern matching or a neural network. The image processing unit 35 outputs, to the output unit 36, the region including the identified object as a region-of-interest and information for identifying the region-of-interest as ROI information. That is, the detection unit 133 detects a region-of-interest using frame data stored in the memory 34.

Note that a value determined in advance can be adopted as the frame width. In this case, the image processing unit 35 can be configured without providing the frame width setting unit 132.

<Generation of Frame Data in Accordance with Event Data>

Figure 10:
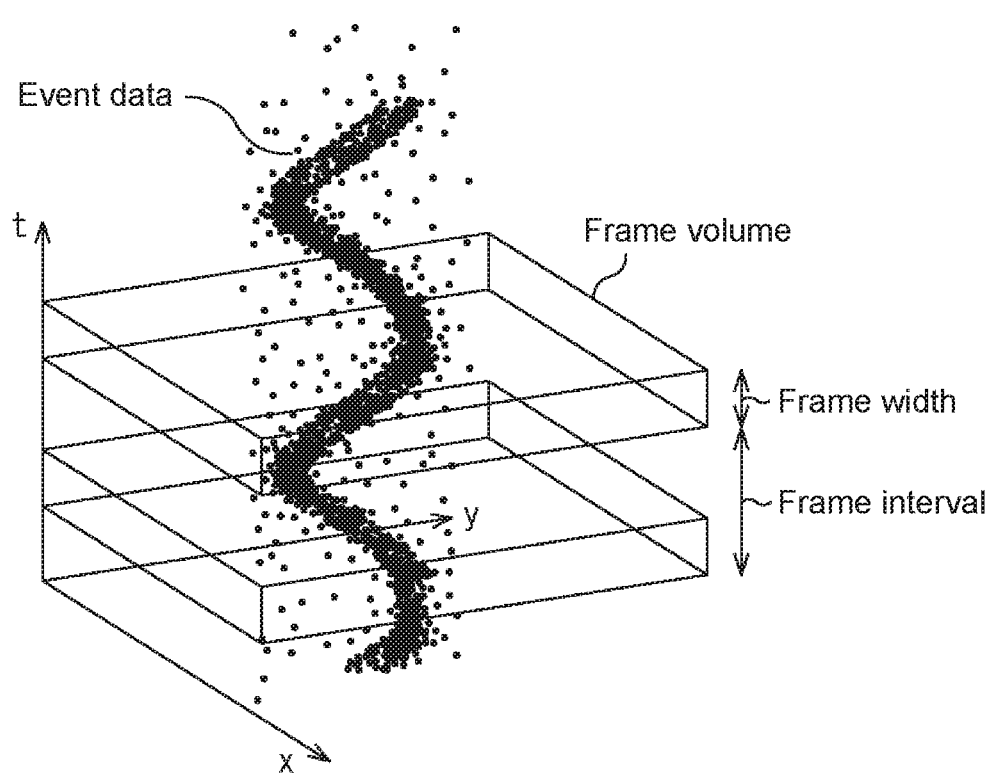
FIG. 10 is a diagram describing an example of a method of generating frame data in accordance with event data.

FIG. 10 is a diagram describing a method of generating frame data in accordance with event data.

Here, assumption is made that event data includes time information (hereinafter, referred to also as the event time) $t_i$ representing the time at which the event has occurred and coordinates (x, y) as position information (hereinafter, referred to also as the event position) of (the pixel block 41 including) the pixel 51 at which the event has occurred.

In FIG. 10, in a three-dimensional (temporal) space composed of an x-axis, a y-axis, and a time axis t, points as event data are plotted on an event time t and (coordinates as) an event position (x, y) included in event data.

That is, when the event time t included in event data and the position (x, y, t) in the three-dimensional space represented by the event position (x, y) are referred to as the spatiotemporal position of an event, event data is plotted as points at the spatiotemporal position (x, y, t) of the event in FIG. 10.

The memory 34 starts generating frame data corresponding to event data using, for example, predetermined time such as the time at which generation of the frame data is instructed from the outside and the time at which the power of the DVS chip 11 is turned on, as the generation start time for starting the generation of frame data.

Here, assumption is made that a rectangular parallelepiped of the set frame width in the time axis t direction for each set frame interval from the generation start time is referred to as a frame volume or a frame unit. The sizes of the frame volume in the x-axis direction and the y-axis direction are equal to, for example, the number of the pixel blocks 41 or the pixels 51 in the x-axis direction and the y-axis direction.

The memory 34 generates and stores frame data of one frame in accordance with event data in the frame volume of the set frame width from the beginning of the set frame interval for each set frame interval.

The frame width and the frame interval may be specified by the time or the number of pieces of event data. One of the frame width and the frame interval may be specified by the time, and the other may be specified by the number of pieces of event data.

The generation of frame data can be performed by, for example, setting white in (a pixel value of) a pixel of the frame of the event position (x, y) included in event data and a predetermined color such as gray in (a pixel value of) a pixel at another position of the frame.

In addition, the generation of frame data can be performed considering the polarity included in event data in the case where the event data includes the polarity of the change in the amount of light as an event. For example, white can be set in a pixel in the case where the polarity is positive, and black can be set in a pixel in the case where the polarity is negative.

Note that in the frame volume, there are a plurality of pieces of event data with the same event position (x, y) in some cases although the event time t differs. In this case, for example, event data whose event time t is the most recent or oldest can be prioritized. Further, in the case where the event data includes the polarity, the polarities of the pieces of event data that have the same event position (x,y) and the different event times t are added, and the pixel value corresponding to the addition value obtained by the addition can be set to the pixel of the event position (x, y).

Here, in the case where the frame width and the frame interval are specified by the time and the frame width and the frame interval are the same, the frame volumes are in a state of being in contact without a gap. Further, in the case where the frame interval is larger than the frame width, the frame volumes are arranged with a gap therebetween. In the case where the frame width is larger than the frame interval, the frame volumes are arranged in a partially overlapping manner. In this embodiment, for simplicity of description, assumption is made that the frame width is the same as the frame interval and event data is accumulated in the memory 34 at predetermined set frame intervals. Since frame data accumulated in the memory 34 at the set frame intervals is updated and detection of an object is sequentially performed, the updating cycle of frame data is equal to the cycle for detecting an object (object detection cycle).

Note that although the object to be detected is identified by image recognition using event data accumulated in the memory 34 at predetermined set frame intervals and set frame widths in this embodiment, the memory 34 can be omitted in the case where, for example, an object is identified by capturing positional displacements of event data acquired in accordance with a lapse of time, <Configuration Example of CIS Chip 12>

Figure 11:
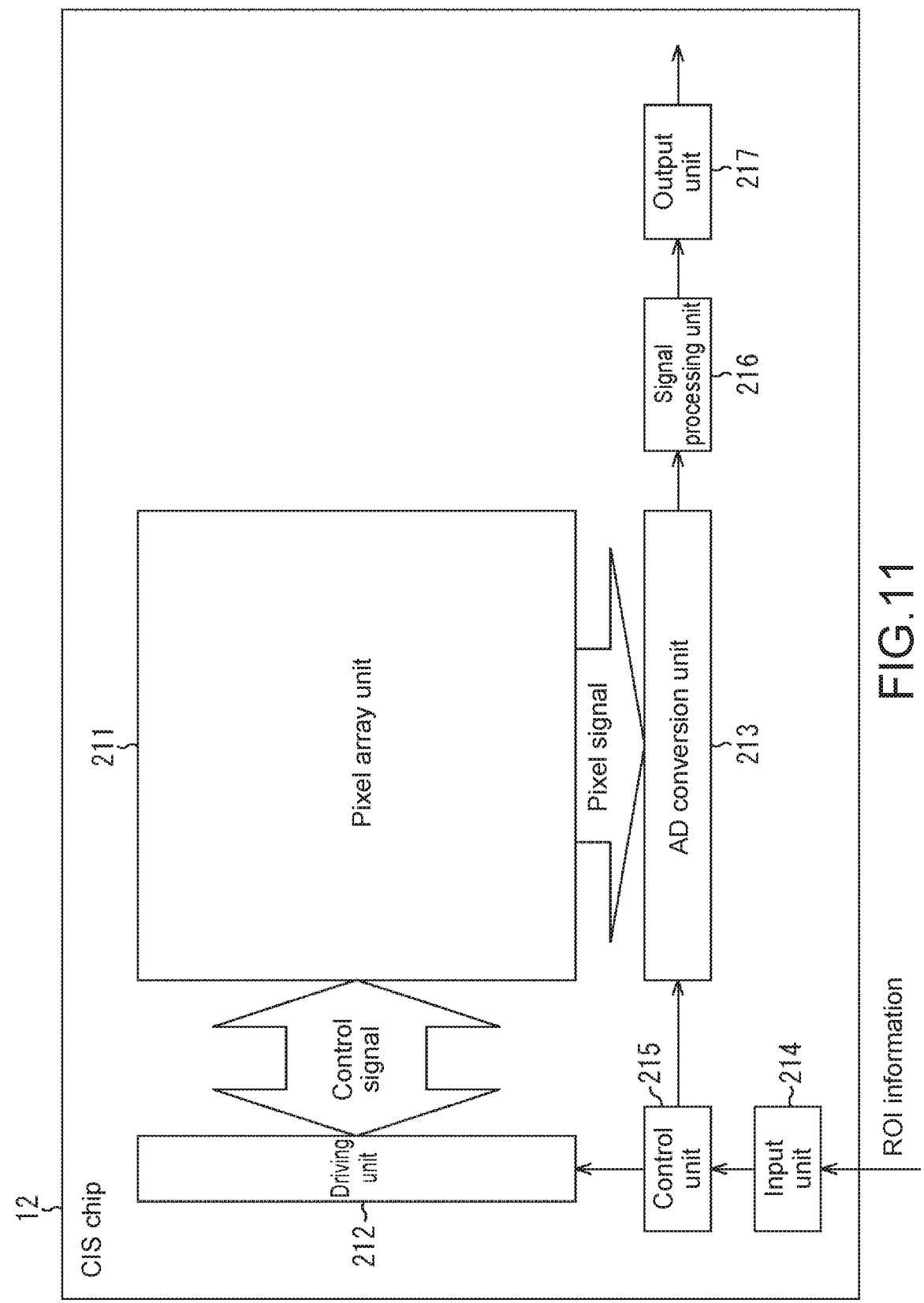
FIG. 11 is a block diagram showing a configuration example of a CIS chip in FIG. 1.

FIG. 11 is a block diagram showing a configuration example of the CIS chip 12 in FIG. 1.

The CIS chip 12 includes a pixel array unit 211, a driving unit 212, an AD (Analog to Digital) conversion unit 213, an input unit 214, a control unit 215, a signal processing unit 216, and an output unit 217.

The pixel array unit 211 includes a plurality of pixels 251 (FIG. 12) is arranged in a two-dimensional lattice. The pixel array unit 211 is divided into a plurality of pixel blocks 241 (FIG. 12) each including a predetermined number of pixels 251. The pixel array unit 211 outputs a pixel signal generated by photoelectric conversion of the pixel 251 to the AD conversion unit 213.

The driving unit 212 drives the pixel array unit 211 by supplying a control signal to the pixel array unit 211. For example, the driving unit 212 drives the pixel 251 of the region-of-interest based on ROI information supplied from the DVS chip 11 to supply (output) a pixel signal of the pixel 251 to the AD conversion unit 213. Note that it goes without saying that the driving unit 212 is capable of driving not only a part of regions of the pixel array unit 211 but all regions of the pixel array unit 211 to supply (output) a pixel signal of the pixel 251 of the entire region to the AD conversion unit 213.

The AD conversion unit 213 includes, for example, a single-slope ADC (AD Converter) (not shown) for each column of the pixel block 241 (FIG. 12) described below. In the ADCs of the respective columns, the AD conversion unit 213 AD-converts the pixel signal of the pixel 251 of the pixel block 241 of the corresponding column and supplies the converted pixel signal to the signal processing unit 216. Note that in the AD conversion unit 213, CDS (Correlated Double Sampling) can be performed together with AD-conversion of the pixel signal.

The input unit 214 acquires ROI information supplied from the DVS chip 11 via the relay board 13 and supplies the acquired ROI information to the control unit 215. In addition, the input unit 214 is capable of acquiring also data for commanding an operation mode or the like from the outside.

The control unit 215 receives, from the input unit 214, ROI information, data instructing an operation mode or the like, and the like. The control unit 215 generates a clock signal and a control signal that serve as a reference for the operation of the driving unit 212, the AD conversion unit 213, or the like. The control unit 215 then outputs the generated clock signal and control signal to the driving unit 212, the AD conversion unit 213, or the like. For example, the control unit 215 supplies, on the basis of ROI information obtained from the input unit 214, a control signal for identifying the drive region of the pixel array unit 211 to the driving unit 212.

The signal processing unit 216 performs predetermined signal processing on the pixel signal sequentially supplied from the AD conversion unit 213. For example, the signal processing unit 216 performs various types of digital signal processing such as black level adjustment processing, column variation correction processing, and gain adjustment processing. The signal processing unit 216 supplies a pixel signal after the digital signal processing to the output unit 217.

The output unit 217 outputs a pixel signal from the signal processing unit 216 to the outside.

<Configuration Example of Pixel Array Unit 211>

Figure 12:
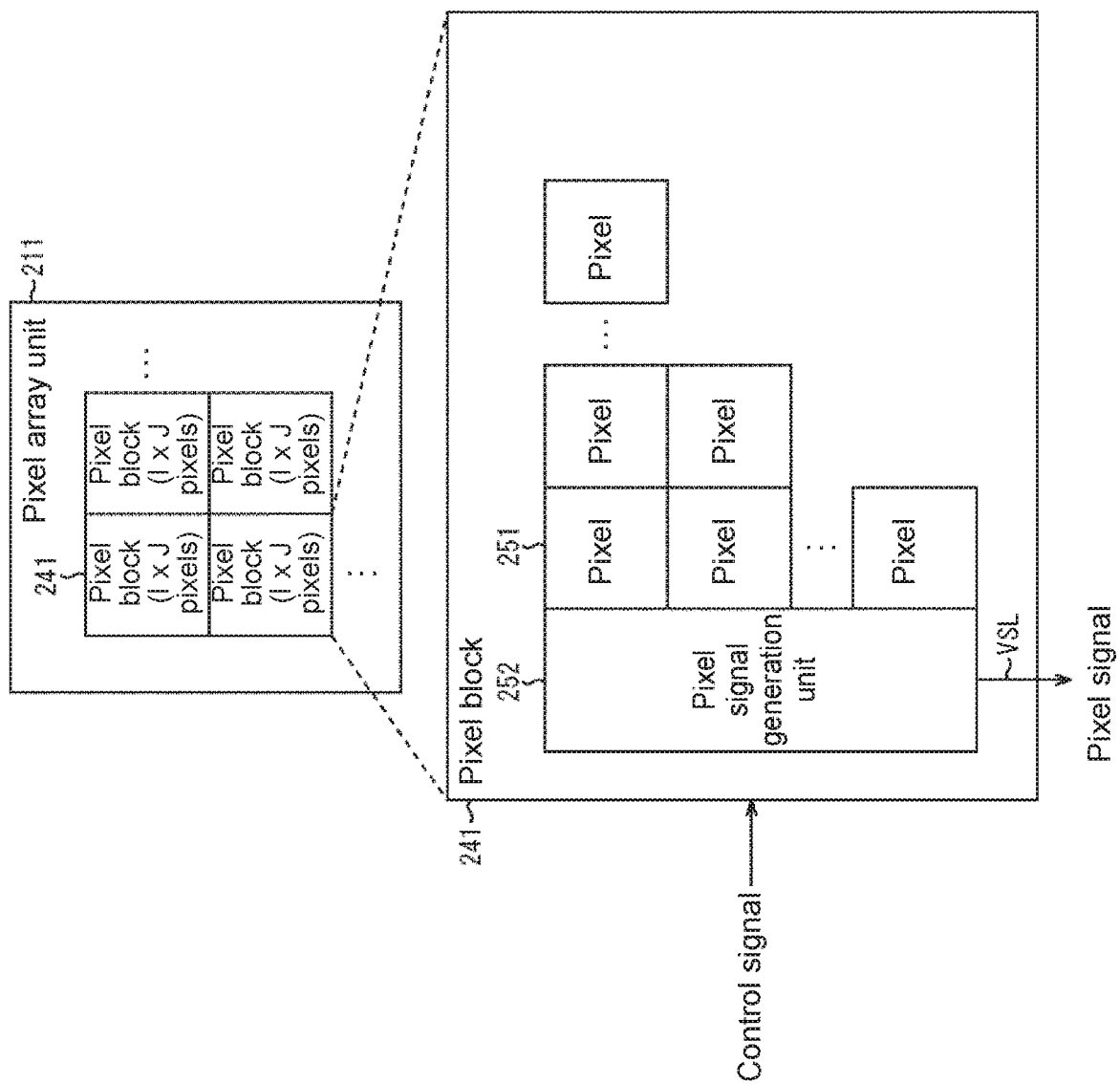
FIG. 12 is a block diagram showing a configuration example of a pixel array unit in FIG. 11.

FIG. 12 is a block diagram showing a configuration example of the pixel array unit 211 in FIG. 11.

The pixel array unit 211 includes the plurality of pixel blocks 241. The pixel block 241 includes one or more I×J pixels 251 arranged in I rows×J columns (I and J are integers), and a pixel signal generation unit 252. As described above, the pixel position of the pixel 251 of each of the pixel blocks 241 corresponds to the pixel position of the pixel 51 of each of the pixel blocks 41 of the pixel array unit 31 of the DVS chip 11.

The one or more pixels 251 in the pixel block 241 share the pixel signal generation unit 252. Further, a VSL (Vertical Signal Line) connecting the pixel block 241 and the ADC of the AD conversion unit 213 to each other is wired for each column of the pixel block 241.

The pixel 251 receives incident light from an object and photoelectrically converts the received incident light to generate a photocurrent as an electrical signal. The pixel signal generation unit 252 generates, as a pixel signal, a voltage corresponding to the photocurrent of the pixel 251, and supplies the generated pixel signal to the AD conversion unit 213 through the VSL.

<Configuration Example of Pixel Block 41>

Figure 13:
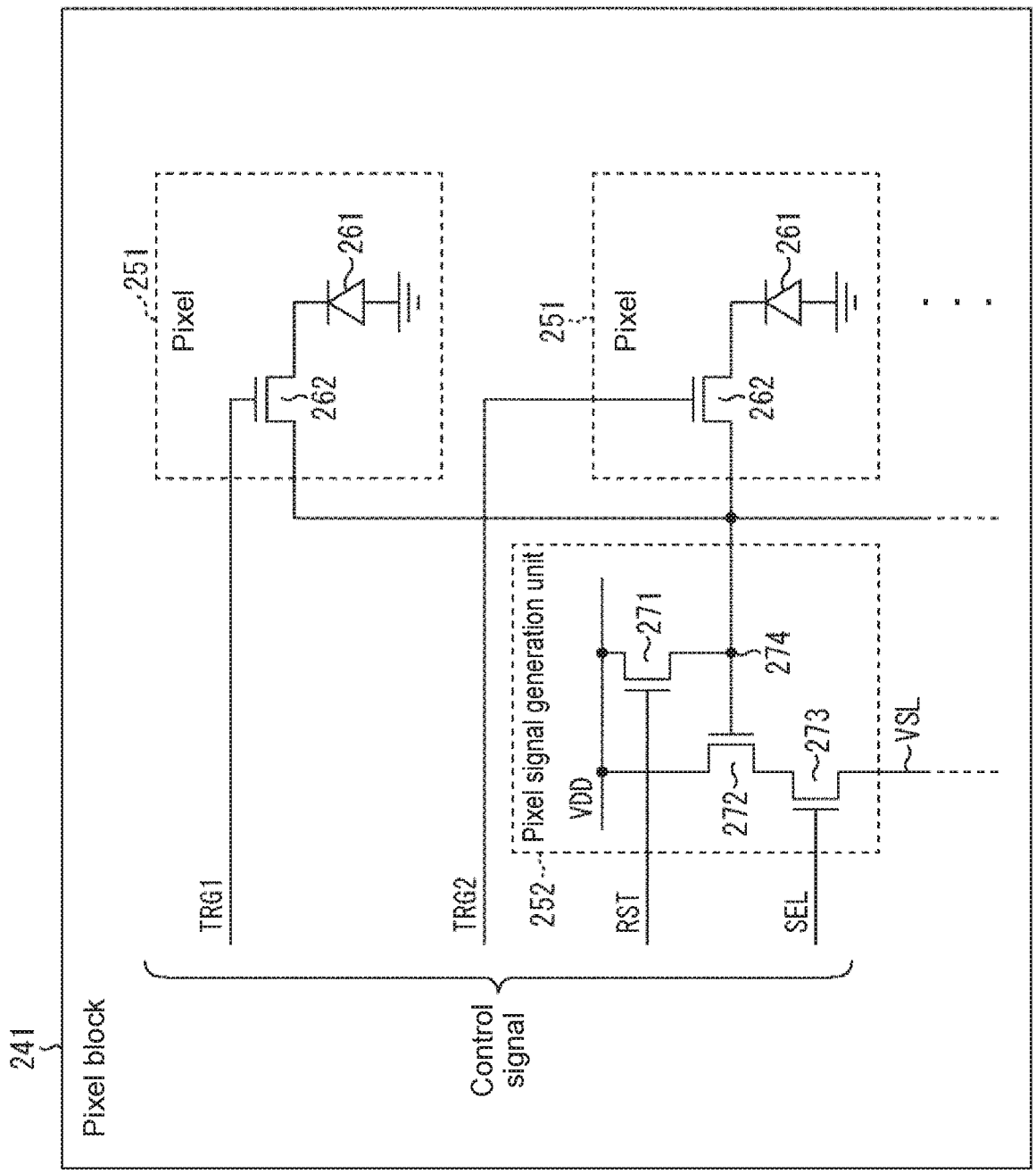
FIG. 13 is a circuit diagram showing a configuration example of a pixel block in FIG. 12.

FIG. 13 is a circuit diagram showing a configuration example of the pixel block 241 in FIG. 12.

As described in FIG. 12, the pixel block 241 includes the one or more pixels 251 and the pixel signal generation unit 252.

The pixel 251 includes a photoelectric conversion element 261 and a transfer transistor 262.

The photoelectric conversion element 261 includes, for example, a PD (Photodiode), receives incident light, and photoelectrically converts the received incident light to generate charges.

The transfer transistor 262 includes, for example, an N (Negative)-type MOS (Metal-Oxide-Semiconductor) FET (Field Effect Transistor). The transfer transistor 262 constituting the n-th pixel 251 of the I×J pixels 251 constituting the pixel block 241 is turned on/off in accordance with a control signal TRGn supplied from the driving unit 212. When the transfer transistor 262 is turned on, charges generated in the photoelectric conversion element 261 are transferred to an FD 274 of the pixel signal generation unit 252.

The pixel signal generation unit 252 includes a reset transistor 271, an amplification transistor 272, a selection transistor 273, and the FD (Floating Diffusion) 274.

The reset transistor 271, the amplification transistor 272, and the selection transistor 273 each include, for example, an N-type MOS FET.

The reset transistor 271 is turned on/off in accordance with a control signal RST supplied from the driving unit 212 (FIG. 11). When the reset transistor 271 is turned on, the FD 274 is connected to the power source VDD, and charges accumulated in the FD 274 are discharged to the power source VDD. This resets the FD 274.

The gate, drain, and source of the amplification transistor 272 are respectively connected to the FD 274, the power source VDD, and the VSL via the selection transistor 273, respectively. The amplification transistor 272 is a source follower and outputs a voltage (electrical signal) corresponding to the voltage of the FD 274 supplied to the gate to the VSL via the selection transistor 273.

The selection transistor 273 is turned on/off in accordance with a control signal SEL supplied from the driving unit 212. When the reset transistor 271 is turned on, the voltage corresponding to the voltage of the FD 274 from the amplification transistor 272 is output to the VSL.

The FD 274 accumulates charges transferred from the photoelectric conversion element 261 of the pixel 251 via the transfer transistor 263 and converts the accumulated charges into a voltage.

Regarding the pixel 251 and the pixel signal generation unit 252 configured as described above, the driving unit 212 sequentially turns on the transfer transistor 262 of the pixel 251 in the pixel block 241 by the control signal TRGn to transfer the charges generated by the photoelectric conversion element 261 to the FD 274. In the FD 274, charges transferred from (the photoelectric conversion element 261 of) the pixel 251 are accumulated. The voltage corresponding to the charges accumulated in the FD 274 is output to the VSL via the amplification transistor 272 and the selection transistor 273 as a pixel signal of the pixel 251.

As described above, in the CIS chip 12 (FIG. 11), the pixel signal of the pixel 251 of the pixel block 241 corresponding to the region-of-interest is sequentially output to the VSL under the control of the driving unit 212. The pixel signal output to the VSL is supplied to the AD conversion unit 213 and AD-converted.

Here, for each of the pixels 251 in the pixel block 241, the transfer transistors 263 can be turned on at the same time instead of being turned on sequentially. In this case, the sum of pixel signals of all the pixels 251 in the pixel block 241 can be output.

In the pixel array unit 211 in FIG. 12, the pixel block 241 includes the one or more pixels 251, and the pixel signal generation unit 252 is shared iby the one or more pixels 251. Therefore, in the case where the pixel block 241 includes the plurality of pixels 251, the number of the pixel signal generation units 252 can be reduced and the size of the pixel array unit 211 can be suppressed as compared with the case where one pixel signal generation unit 252 is provided for one pixel 251.

Note that even in the case where the pixel block 241 includes the plurality of pixels 251, the pixel signal generation unit 252 can be provided for each of the pixels 251. In the case where the pixel signal generation unit 252 is provided for each of the pixels 251, it is unnecessary to sequentially turn on the transfer transistors 263 of the plurality of pixels 251 constituting the pixel block 241, and the transfer transistors 263 can be turned on at the same time to detect a pixel signal in units of the pixels 251.

However, for simplification of description, description will be made below assuming that a pixel block includes one pixel in both the pixel array unit 31 of the DVS chip 11 and the pixel array unit 211 of the CIS chip 12, unless otherwise identified. That is, description will be made assuming that the pixel block 41 of the pixel array unit 31 of the DVS chip 11 includes one pixel 51 and the event detection unit 52, and the pixel block 241 of the pixel array unit 211 of the CIS chip 12 include one pixel 251 and the pixel signal generation unit 252.

<Processing of Solid-State Imaging Device 10>

Referring to the flowchart of FIG. 14, the operation of the solid-state imaging device 10 will be described. For example, the processing in FIG. 14 is started when the power of the solid-state imaging device 10 is turned on.

Figure 14:
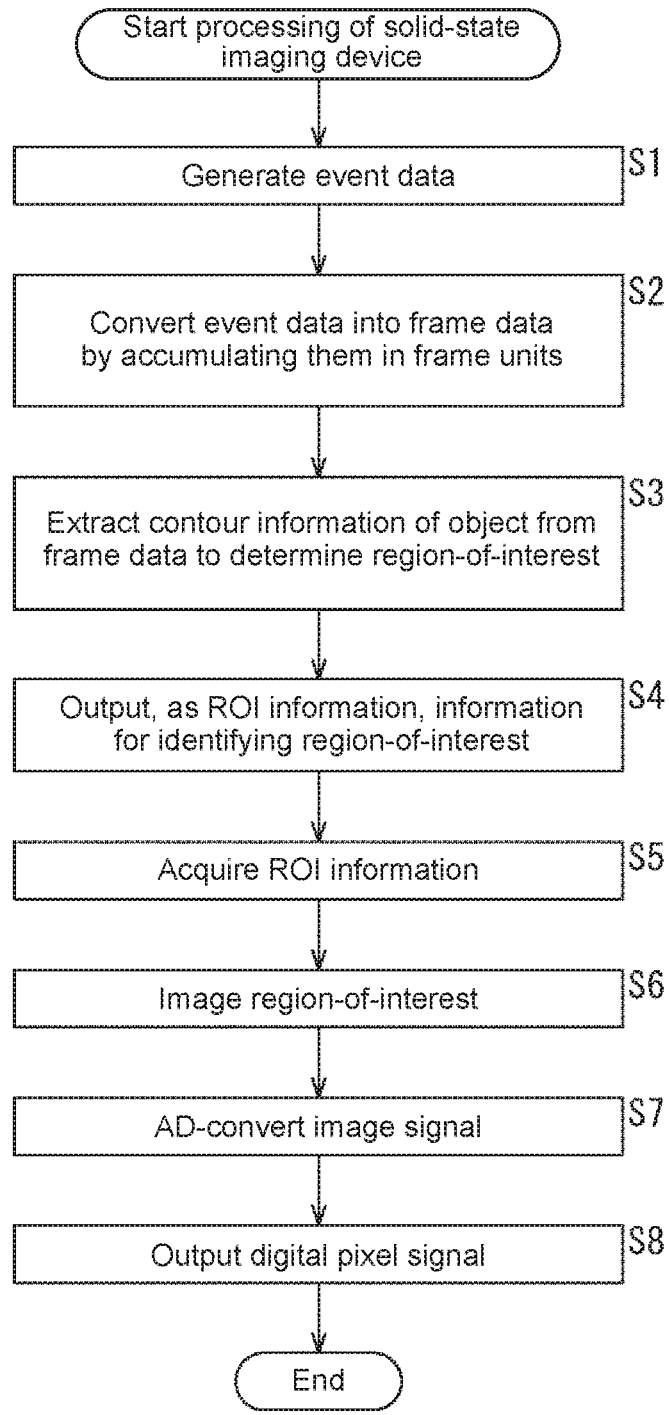
FIG. 14 is a flowchart describing an operation of a solid-state imaging device.

Note that in the processing in FIG. 14, the set frame interval and the set frame width set by the frame interval setting unit 131 and the frame width setting unit 132 are set to predetermined values in advance after being adjusted.

First, in Step S1, the pixel array unit 31 of the DVS chip 11 generates, in the case where a change in the electrical signal as an event occurs in any of the plurality of pixels 51 constituting the pixel array unit 31, event data and supplies the generated event data to the memory 34. More specifically, the pixel array unit 31 outputs, in the case where an event is detected, a request for outputting event data representing an occurrence of an event to the arbiter 33. The pixel array unit 31 then outputs, in the case of receiving a response representing permission of outputting event data from the arbiter 33, event data to the memory 34.

In Step S2, the memory 34 converts event data from the pixel array unit 31 into frame data by accumulating the event data in predetermined frame units.

In Step S3, the image processing unit 35 performs data processing in accordance with the event data in frame units accumulated in the memory 34, and outputs the data processing result that is the result of the data processing to the output unit 36. More specifically, the detection unit 133 extracts the contour information of an object from frame data, and identifies the object to be detected. Then, the detection unit 133 determines a region-of-interest including the identified object and outputs the determined region-of-interest to the output unit 36.

In Step S4, the output unit 36 outputs, as ROI information (Region Of Interest), the information for identifying the region-of-interest supplied from the image processing unit 35 to the CIS chip 12 via the relay board 13.

In Step S5, the input unit 214 acquires ROI information supplied from the DVS chip 11 via the relay board 13 and supplies the acquired ROI information to the control unit 215. The control unit 215 provides a control signal that identifies the drive region of the pixel array unit 211 to the driving unit 212 on the basis of the ROI information acquired from the input unit 214

In Step S6, the pixel array unit 211 images a region-of-interest under the control of the driving unit 212. That is, the driving unit 212 drives the pixel 251 of the region-of-interest on the basis of the control signal that identifies the drive area of the pixel array unit 211 supplied from the control unit 215. The pixel array unit 211 supplies a pixel signal of the region-of-interest to the AD conversion unit 213 under the control of the driving unit 212.

In Step S7, the AD conversion unit 213 converts (AD conversion) an analogue pixel signal sequentially input in the row units of the pixel array unit 211 into a digital signal as well as performs CDS thereon, and supplies the result to the signal processing unit 216.

In Step S8, the signal processing unit 216 performs predetermined signal processing on the digital pixel signal sequentially supplied from the AD conversion unit 213, as necessary, and supplies the processed signal to the output unit 217. The output unit 217 outputs the digital pixel signal from the signal processing unit 216 to the outside.

The processing from Steps S1 to S4 is executed by the DVS chip 11 of the solid-state imaging device 10, and the processing of Steps S5 to S8 is executed by the CIS chip 12 of the solid-state imaging device 10.

In the DVS chip 11, in the case where an occurrence of an event is detected, a region-of-interest is determined by identifying the object to be detected, and information for identifying the region-of-interest is supplied to the CIS chip 12 as ROI information. In the CIS chip 12, (the region corresponding to) the region-of-interest determined by the DVS chip 11 is imaged, and a pixel signal of the respective pixels of the region-of-interest is output.

For example, even in the case where a solid-state imaging device includes only the CIS chip 12 as in a typical CMOS image sensor, imaging is performed in the entire region of the pixel array unit 211 in the CIS chip 12, an object to be detected is identified from the captured image by image recognition such as pattern matching to determine the region-of-interest, and then a pixel signal of the respective pixels of the region-of-interest can be acquired.

However, when imaging is performed in the entire region of the pixel array unit 211 in order to determine the region-of-interest, the processing-load of the image-recognition is also increased, and power consumption is also increased. In order to reduce the power consumption and the processing-load of image recognition, a method of executing imaging at a low resolution by thinning out the imaging pixel of the pixel array unit 211 is conceivable. However, in the case where the detection target cannot be detected at a low resolution, it is necessary to further increase the resolution and execute the imaging and the image recognition again.

In contrast, in accordance with the solid-state imaging device 10 in FIG. 1, the detection target range of the DVS chip 11 is the same as the imaging range of the pixel array unit 211 of the CIS chip 12 without being thinned out, and an occurrence of an event is output in a low bit, i.e., 1-bit or 1.5-bit (ternary). Therefore, an occurrence of an event of the same imaging range as that of the pixel array unit 211 of the CIS chip 12 can be detected without a lack of spatial information and with low power consumption. Then, in the CIS chip 12, imaging of the region-of-interest determined by the DVS chip 11 is performed, so that imaging of the region-of-interest can be performed at high speed. By driving only a part of the region of the pixel array unit 211, it is possible to reduce the power consumption of the CIS chip 12.

2. Second Embodiment

Figure 15:
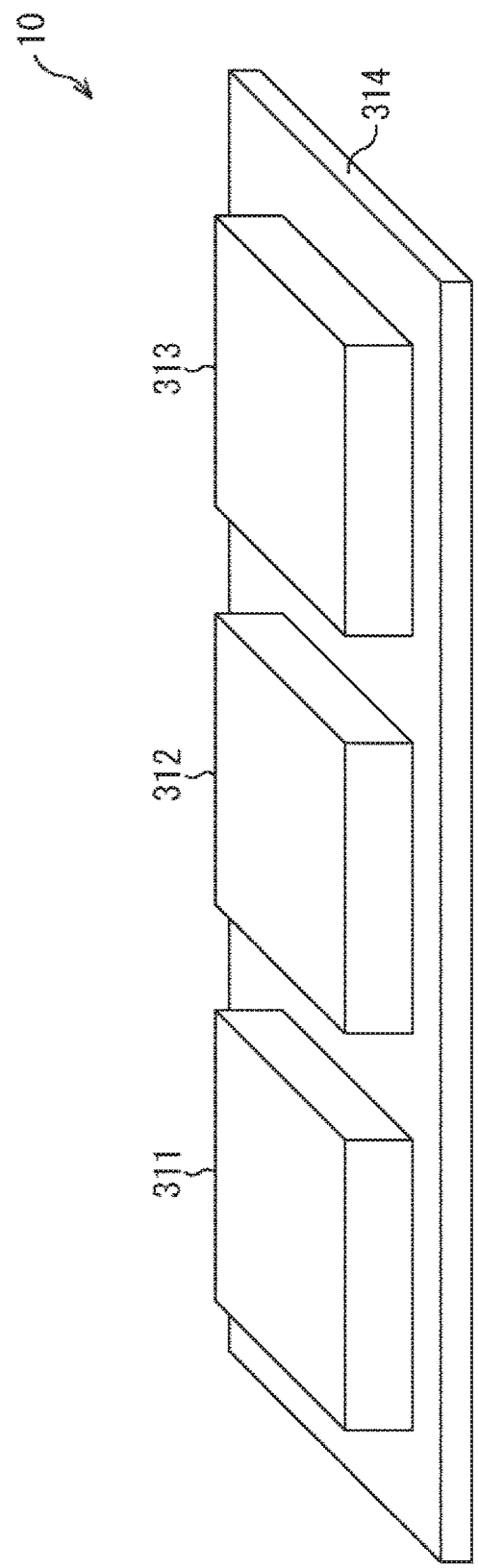
FIG. 15 is a diagram showing a configuration example of a second embodiment of a solid-state imaging device to which the present technology is applied.

FIG. 15 is a diagram showing a configuration example of a second embodiment of a solid-state imaging device to which the present technology is applied.

Although two chips, i.e., the DVS chip 11 that detects an occurrence of an event and outputs ROI information for identifying the region-of-interest and the CIS chip 12 that images the region-of-interest are provided in the first embodiment in FIG. 1, three chips are provided in the second embodiment.

The solid-state imaging device 10 according to the second embodiment includes a first chip 311, a second chip 312, a third chip 313, and a relay board (interposer board) 314 on which the first chip 311, the second chip 312, and the third chip 313 are mounted.

The solid-state imaging device 10 according to the second embodiment is configured such that at least a part of the digital signal processing of each of the DVS chip 11 and the CIS chip 12 in the first embodiment is executed by another DSP (digital signal processor) chip.

Specifically, the first chip 311 includes a circuit excluding a part of the digital signal processing circuit of the DVS chip 11 in the first embodiment, and the second chip 312 includes a circuit excluding a part of the digital signal processing circuit of the CIS chip 12 in the first embodiment. In the third chip 313, a circuit excluded from the first chip 311 and the second chip 312 is formed. In the following, for ease of discrimination, the first chip 311 will be referred to as the DVS chip 311, the second chip 312 will be referred to as the CIS chip 312, and the third chip 313 will be referred to as the DSP chip 313.

The relay board 314 includes a signal wiring for relaying signals between the DVS chip 311, the CIS chip 312, and the DSP chip 313, and an output terminal that outputs the output signal of the solid-state imaging device 10 to the outside. The output terminal includes, for example, a solder ball formed on the side opposite to the mounting surface of the DVS chip 311 and the CIS chip 312.

<Configuration Example of Each Chip>

Figure 16:
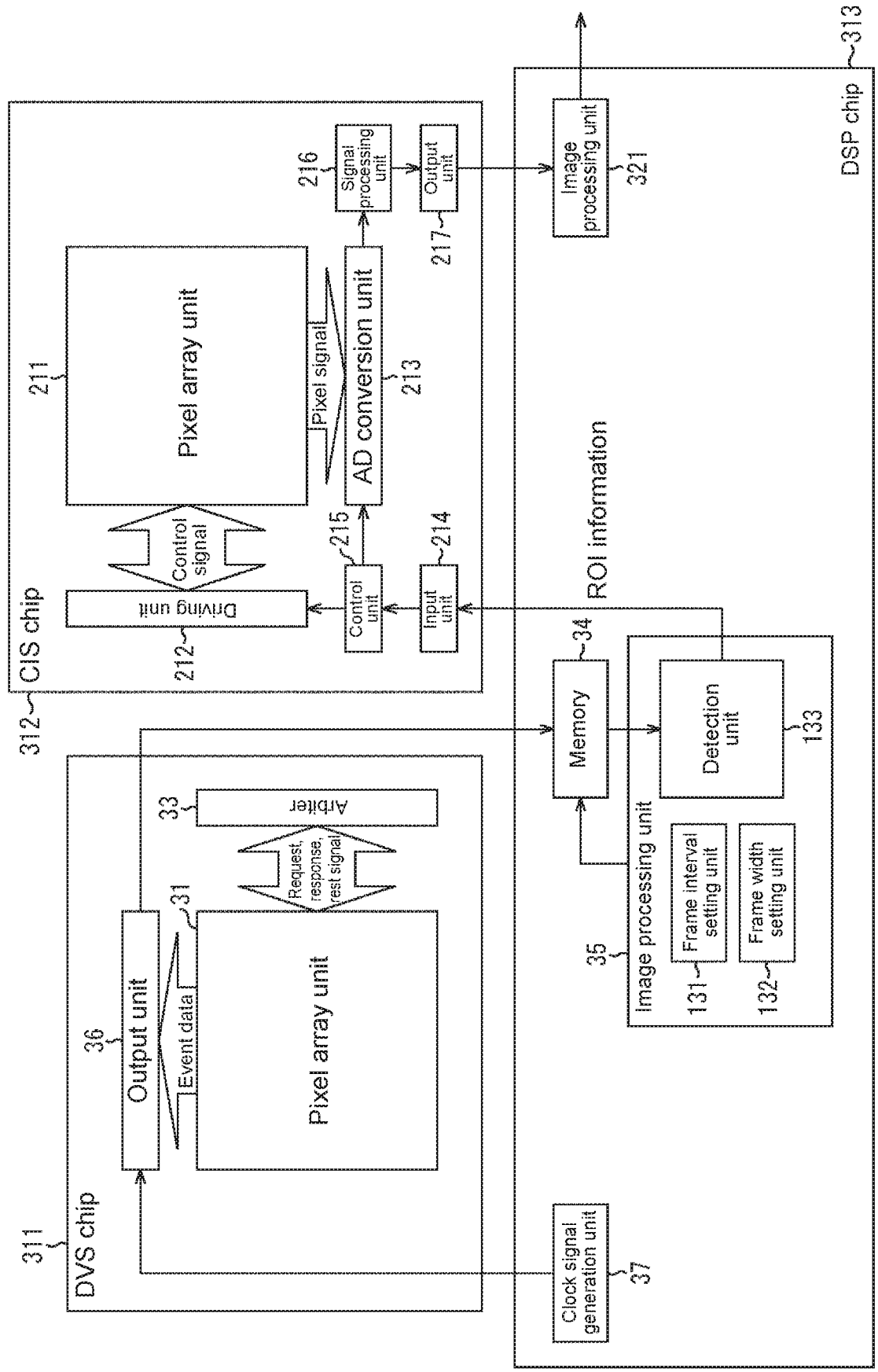
FIG. 16 is a block diagram showing a configuration example of a DVS chip, CIS chip, and a DSP chip.

FIG. 16 is a block diagram showing a configuration example of the DVS chip 311, the CIS chip 312, and the DSP chip 313.

In FIG. 16, components corresponding to the configurations in the first embodiment shown in FIG. 2 FIG. 9, and FIG. 11 will be denoted by the same reference symbols, and description thereof will be omitted as appropriate.

Comparing the DVS chip 11 in FIG. 2 in the first embodiment with the DVS chip 311 in the second embodiment, the memory 34, the image processing unit 35, and the clock signal generation unit 37 included in the DVS chip 11 in the first embodiment are moved to the DSP chip 313 in the second embodiment. Thus, event data output from the pixel array unit 31 is supplied to the output unit 36, and the output unit 36 outputs the event data to the memory 34 of the DSP chip 313.

The CIS chip 312 in the second embodiment is configured similarly to the CIS chip 12 in FIG. 11 in the first embodiment.

The DSP chip 313 includes an image processing unit 321 as well as the memory 34, the image processing unit 35, and the clock signal generation unit 37.

The image processing unit 321 of the DSP chip 313 acquires the digital pixel signal input from the output unit 217 of the CIS chip 312. The image processing unit 321 performs predetermined image processing, e.g., demosaicing, on a pixel signal of the region-of-interest input from the CIS chip 312, and outputs (a signal of) an image obtained as a result of the processing to the outside. Further, the image processing unit 321 may execute a part of the signal processing performed in the signal processing unit 216 of the CIS chip 312 in the first embodiment. The image processing unit 321 includes a memory (frame memory) that temporarily stores a pixel signal, as necessary.

The processing of the solid-state imaging device 10 according to the second embodiment can be executed in a way similar to the processing in FIG. 14 described in the first embodiment, and thus the description thereof is omitted. Further, in the processing of the solid-state imaging device 10 according to the second embodiment, the image processing by the image processing unit 321 of the DSP chip 313 can be additionally performed at the end of the processing described in FIG. 14.

Therefore, even in the solid-state imaging device 10 according to the second embodiment, which includes the three-chip, an occurrence of an event can be detected in the same detection target range as the imaging range without thinning-out, without a lack of spatial information and with low power consumption, and imaging of the region-of-interest can be performed at high speed. Power consumption can also be reduced by driving only the region-of-interest.

3. Third Embodiment

Figure 17:
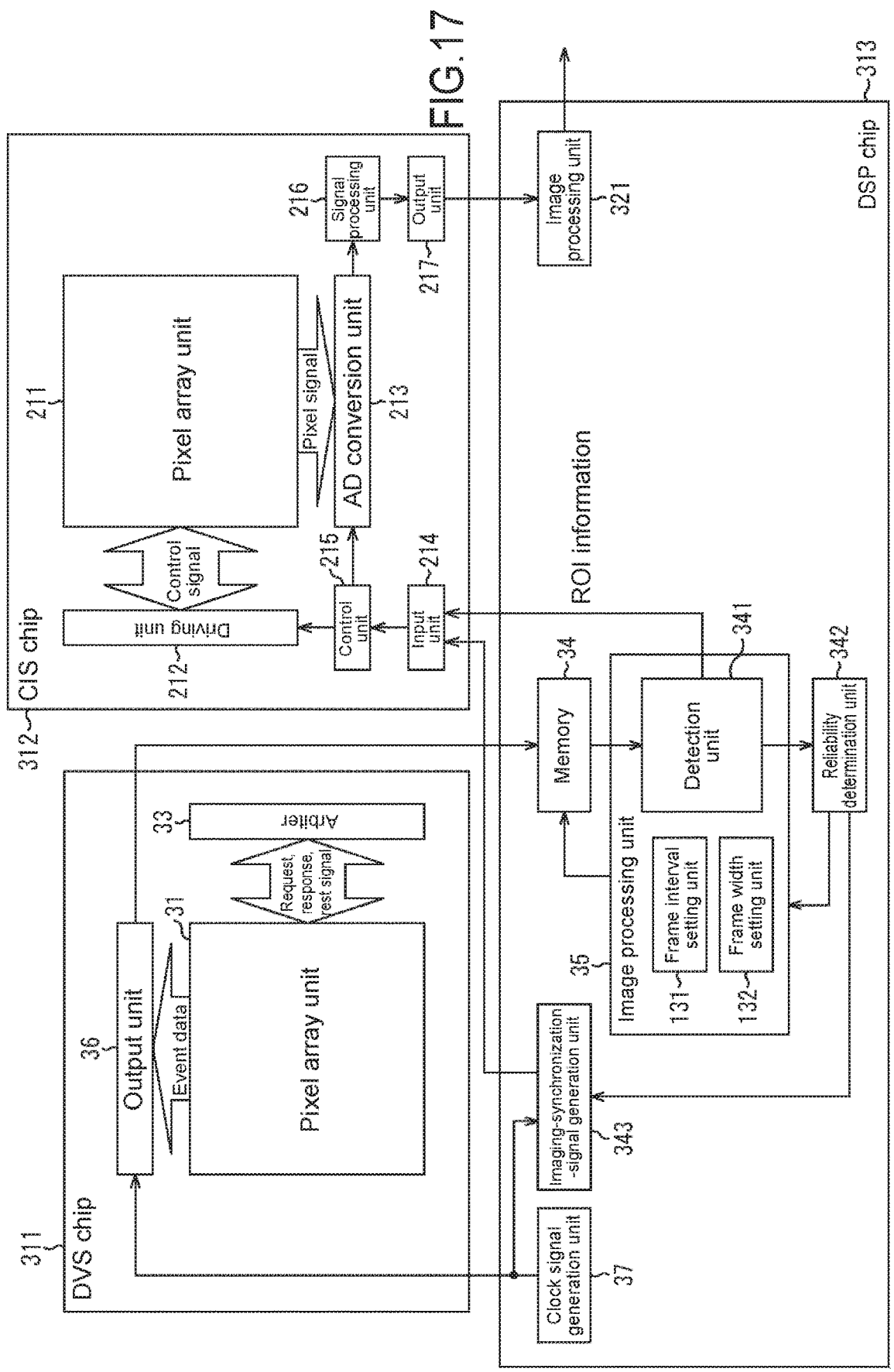
FIG. 17 is a block diagram showing a configuration example of a third embodiment of a solid-state imaging device to which the present technology is applied.

FIG. 17 is a block diagram showing a configuration example of a third embodiment of a solid-state imaging device to which the present technology is applied.

The solid-state imaging device 10 according to the third embodiment includes three chips of the DVS chip 311, the CIS chip 312, and the DSP chip 313, similarly to the second embodiment. The schematic perspective view of the solid-state imaging device 10 according to the third embodiment is similar to that in FIG. 15, and thus, illustration thereof is omitted.

In the block diagram of FIG. 17, components corresponding to those in the second embodiment in FIG. 16 will be denoted by the same reference symbols, and description thereof will be omitted as appropriate.

A detection unit 341, a reliability determination unit 342, and an imaging-synchronization-signal generation unit 343 of the DSP chip 313 in FIG. 17 are different from the second embodiment, and the rest is the same as the second embodiment.

The detection unit 133 of the image processing unit 35 in the second embodiment has been replaced by the detection unit 341 in the third embodiment.

The set frame interval and set frame width when generating frame data have been fixed values determined in advance in the first and second embodiments, the set frame interval and the set frame width are changed in accordance with the detection result of the detection unit 341 in the third embodiment.

Specifically, the detection unit 341 identifies an object to be detected by image recognition using frame data stored in the memory 34, and extracts outline information of the object as in the detection unit 133 in the second embodiment. Then, the image processing unit 35 respectively outputs, to the input unit 214 of the CIS chip 312, the region including the identified object and information for identifying the region-of-interest as a region-of-interest and as ROI information.

Further, the detection unit 341 supplies the recognition result of the image recognition, in other words, the result of detecting the object, to the reliability determination unit 342. For example, the detection unit 341 assigns the presence or absence of object detection to 1 and 0 in units of frames, calculates the ratio of 1 in a predetermined number of frames traced back from the most recent frame to the past frame as the detection ratio, and outputs the calculated ratio to the reliability determination unit 342.

The reliability determination unit 342 determines the reliability of object detection on the basis of the detection ratio supplied from the detection unit 341, and controls the frame unit (frame volume) in which the memory 34 accumulates event data. Here, assuming that the frame width and the frame interval are the same even in the third embodiment and the frame unit is set only by setting the frame interval, the reliability determination unit 342 controls the frame interval at which the memory 34 accumulates event data in accordance with the detection ratio. Specifically, the reliability determination unit 342 supplies, in the case where the detection ratio supplied from the detection unit 341 is smaller than the internally stored threshold value, i.e., in the case where an object is not sufficiently detected, a frame control signal for increasing the frame interval to the image processing unit 35. Meanwhile, in the case where the detection ratio is larger than or equal to the internally stored threshold value, the reliability determination unit 342 supplies a frame control signal for reducing the frame interval to the image processing unit 35. Note that the frame interval may be changed to a large value in the case where the detection ratio is smaller than a first threshold value, the current frame interval may be maintained in the case where the detection ratio is larger than or equal to the first threshold and smaller than a second threshold value (the first threshold value<the second threshold value), and the frame interval may be changed to a smaller value in the case where the detection ratio is larger than or equal to the second threshold value.

Further, the reliability determination unit 342 generates an imaging cycle control signal for controlling the imaging cycle in accordance with the frame units in which the memory 34 accumulates event data, and supplies the generated signal to the imaging-synchronization-signal generation unit 343. That is, in the case where the frame interval is short and the CIS chip 312 cannot be driven at as high speed as the cycle for detecting an object (object detection cycle), the reliability determination unit 342 generates an imaging cycle control signal that sets the imaging cycle to be large, and supplies the generated signal to the imaging-synchronization-signal generation unit 343. Meanwhile, in the case where the object detection cycle is slow and the imaging cycle of the CIS chip 312 can be made coincident with the object detection cycle, the reliability determination unit 342 generates an imaging cycle control signal for making the imaging cycle the same as the object detection cycle, and supplies the generated imaging cycle control signal to the imaging-synchronization-signal generation unit 343. The imaging cycle in which the CIS chip 312 can be driven can vary depending on also the region size of the region-of-interest. Therefore, also in the case where imaging of the CIS chip 312 can be driven at high speed in accordance with the object detection cycle due to the smaller region size of the region-of-interest, an imaging cycle control signal for matching the imaging cycle with the object detection cycle is supplied to the imaging-synchronization-signal generation unit 343.

The imaging-synchronization-signal generation unit 343 generates an imaging synchronization signal in accordance with the imaging cycle control signal from the reliability determination unit 342, and outputs the generated signal to the input unit 214 of the CIS chip 312.

More specifically, a clock signal (master clock) is supplied to the imaging-synchronization-signal generation unit 343 from the clock signal generation unit 37. The clock signal generation unit 37 supplies the generated clock signal not only to the output unit 36 of the DVS chip 311 but also to the imaging-synchronization-signal generation unit 343.

The imaging-synchronization-signal generation unit 343 includes, for example, a frequency divider circuit, and generates an imaging synchronization signal by dividing the clock signal from the clock signal generation unit 37. The generated imaging synchronization signal is output to the input unit 214 of the CIS chip 312. The imaging-synchronization-signal generation unit 343 generates, in the case where the imaging cycle control signal for setting the imaging cycle to be large is supplied from the reliability determination unit 342, an imaging synchronization signal obtained by dividing the clock signal by a predetermined division ratio. In the case where an imaging cycle control signal for matching the imaging cycle with the object detection cycle is supplied from the reliability determination unit 342, the imaging-synchronization-signal generation unit 343 outputs the clock signal as it is to the input unit 214 of the CIS chip 312 as the imaging synchronization signal without dividing the clock signal.

Note that instead of generating an imaging synchronization signal obtained by simply dividing the cycle of the clock signal from the clock signal generation unit 37 to 1/n (n>1), the imaging-synchronization-signal generation unit 343 may generate an imaging synchronization signal obtained by dividing the cycle of the clock signal to 1/n to achieve a video rate of 30 fps, 60 fps, or 120 fps. Whether to set to 30 fps, 60 fps, or 120 fps can be determined by, for example, user setting.

<Processing of Solid-State Imaging Device 10>

Figure 18:
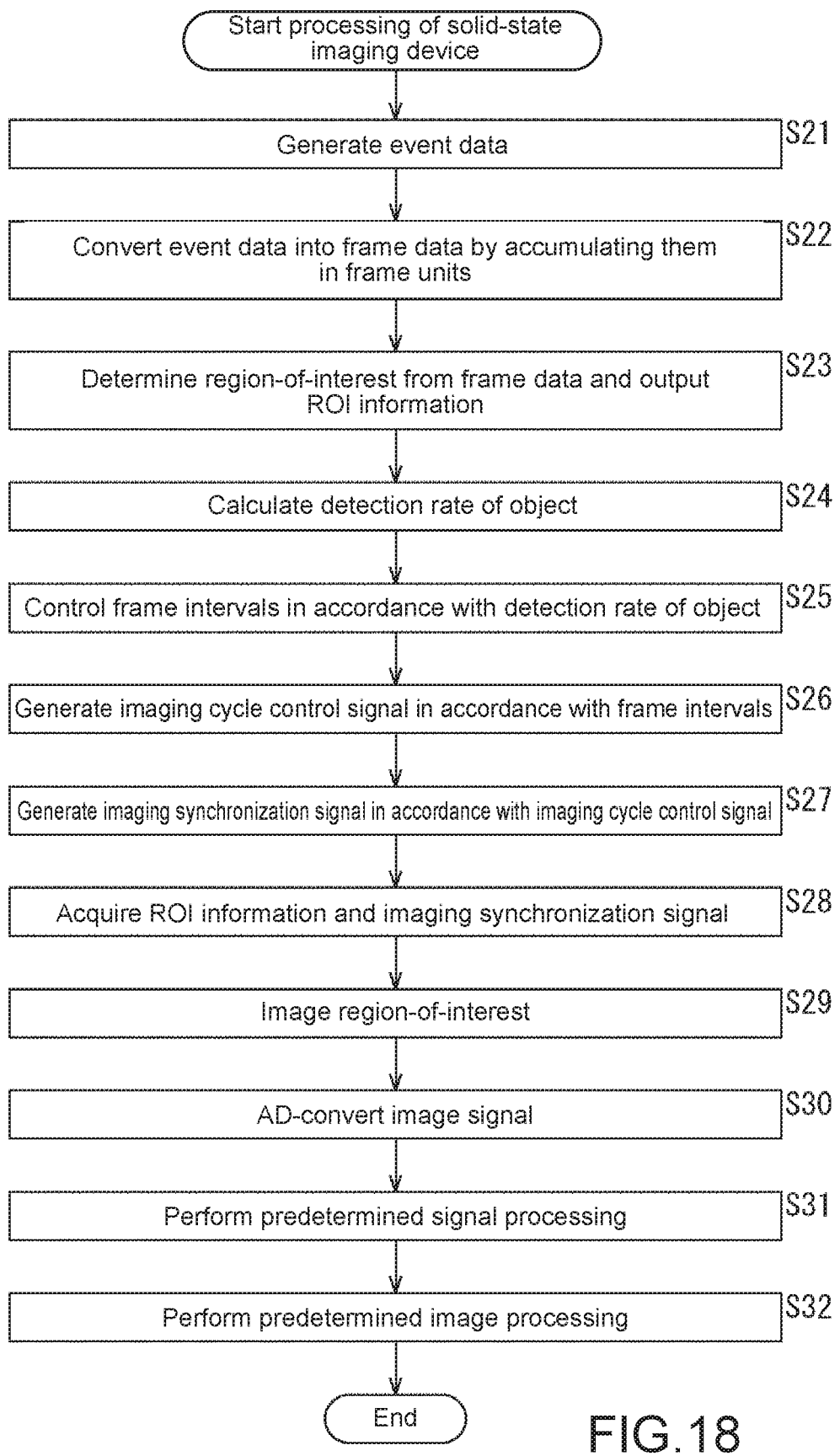
FIG. 18 is a flowchart describing processing of the solid-state imaging device according to the third embodiment.

FIG. 18 is a flowchart describing the processing of the solid-state imaging device 10 according to the third embodiment. For example, the processing in FIG. 18 is started when the power of the solid-state imaging device 10 is turned on.

Note that in the processing in FIG. 18, the set frame interval and the set frame width as initial values are set to predetermined values in advance.

First, in Step S21, when a change in the electrical signal as an event occurs in any of the plurality of pixels 51 constituting the pixel array unit 31, the pixel array unit 31 of the DVS chip 11 generates event data and supplies the generate event data to the output unit 36. More specifically, in the case where the pixel array unit 31 detects an event, the pixel array unit 31 outputs a request for outputting event data representing an occurrence of the event to the arbiter 33. The pixel array unit 31 then outputs, in the case of receiving a response representing permission of outputting event data from the arbiter 33, event data to the output unit 36. The output unit 36 outputs the event data from the pixel array unit 31 to the memory 34 of the DSP chip 313.

In Step S22, the memory 34 of the DSP chip 313 converts event data from the output unit 36 of the DVS chip 11 into frame data by accumulating the event data in predetermined frame units.

In Step S23, the detection unit 341 of the image processing unit 35 performs data processing in accordance with the event data in frame units accumulated in the memory 34, and outputs the resulting ROI information of the data processing to the input unit 214 of the CIS chip 312 through the relay board 314. More specifically, the detection unit 341 extracts the contour information of an object from frame data, and identifies the object to be detected. The detection unit 341 then determines the region-of-interest including the identified object, and outputs the ROI information for identifying the region-of-interest to the input unit 214 of the CIS chip 312.

In Step S24, the detection unit 341 calculates the detection ratio of the object as the recognition result of the image recognition, and supplies the calculated detection ratio to the reliability determination unit 342. The detection ratio of the object is supplied to the reliability determination unit 342 in units of frames, for example.

In Step S25, the reliability determination unit 342 controls the frame interval at which the memory 34 accumulates event data in accordance with the detection ratio supplied from the detection unit 341. In the case where the detection ratio is smaller than the threshold value and the object is not sufficiently detected, the reliability determination unit 342 supplies a frame control signal for increasing the frame interval to the image processing unit 35. Meanwhile, in the case where the detection ratio is larger than or equal to the internally stored threshold value, the reliability determination unit 342 supplies a frame control signal for reducing the frame interval to the image processing unit 35. Note that in the case where the detection ratio is larger than or equal to the internally stored threshold value, the frame interval may be maintained without being changed.

In Step S26, the reliability determination unit 342 generates an imaging cycle control signal for controlling the imaging cycle in accordance with the frame interval, and supplies the generated imaging cycle control signal to the imaging-synchronization-signal generation unit 343. Specifically, in the case where the frame interval is short and the CIS chip 312 cannot be driven as fast as the object detection cycle, the reliability determination unit 342 generates an imaging cycle control signal for setting the imaging cycle to be larger than the current setting, and supplies the generated imaging cycle control signal to the imaging-synchronization-signal generation unit 343. Meanwhile, in the case where the object detection cycle is slow and the imaging cycle of the CIS chip 312 can be made coincident with the object detection cycle, the reliability determination unit 342 generates an imaging cycle control signal for making the imaging cycle the same as the object detection cycle, and supplies the generated imaging cycle control signal to the imaging-synchronization-signal generation unit 343.

In Step S27, the imaging-synchronization-signal generation unit 343 generates an imaging synchronization signal in accordance with the imaging cycle control signal from the reliability determination unit 342, and outputs the generated signal to the input unit 214 of the CIS chip 312.

In Step S28, the input unit 214 of the CIS chip 312 acquires the ROI information and the imaging synchronization signal supplied from the DSP chip 313 via the relay board 314, and supplies them to the control unit 215. The ROI information is supplied from the detection unit 133 of the DSP chip 313, and the imaging synchronization signal is supplied from the imaging-synchronization-signal generation unit 343 of the DSP chip 313. The control unit 215 supplies a control signal for identifying the drive region of the pixel array unit 211 to the driving unit 212 on the basis of the ROI information acquired from the input unit 214. Further, the control unit 215 supplies the imaging synchronization signal acquired from the input unit 214 to the driving unit 212, the AD conversion unit 213, and the like.

In Step S29, the pixel array unit 211 images a region-of-interest under the control of the driving unit 212. That is, the driving unit 212 drives the pixel 251 of the region-of-interest on the basis of the control signal for identifying the drive region of the pixel array unit 211 from the input unit 214. The pixel array unit 211 supplies the pixel signal of the region-of-interest to the AD conversion unit 213 under the control of the driving unit 212.

In Step S30, the AD conversion unit 213 converts (AD conversion) an analogue pixel signal to be sequentially input in the row units of the pixel array unit 211 into a digital signal as well as performs CDS thereon, and supplies the result to the signal processing unit 216.

In Step S31, the signal processing unit 216 performs predetermined signal processing on the digital pixel signal sequentially supplied from the AD conversion unit 213, as necessary, and supplies the processed signal to the output unit 217. The output unit 217 outputs the digital pixel signal from the signal processing unit 216 to the DSP chip 313.

In Step S32, the image processing unit 321 of the DSP chip 313 executes predetermined image processing, e.g., demosaicing of a pixel signal, on the pixel signal from the CIS chip 312, and outputs it to the outside. The image of the region-of-interest generated by demosaicing of the pixel signal is output to the outside.

The processing of Step S21 is executed by the DVS chip 311, the processing of Steps S22 to S27 and Step S32 is executed by the DSP chip 313, and the processing of Step S28 to S31 is executed by the CIS chip 312.

In accordance with the third embodiment, an occurrence of an event is detected in the DVS chip 311 and output to the DSP chip 313. In the DSP chip 313, event data is accumulated in predetermined frame periods, and the object to be detected is identified to determine the region-of-interest. Information for identifying the region-of-interest is supplied to the CIS chip 312 as ROI information. In the CIS chip 312, (the region corresponding to) the region-of-interest determined by the DVS chip 311 is imaged, and the pixel signal of each of the pixels of the region-of-interest is output.

In the DSP chip 313, the detection ratio of the object is calculated, and the frame volume is controlled in accordance with the detection ratio. For example, the object detection cycle is controlled so as to increase the frame interval in the case where the detection ratio is smaller than predetermined threshold value, and the object detection cycle is controlled so as to reduce the frame interval in the case where the detection ratio is equal to or larger than the predetermined threshold value.

Further, the imaging cycle of the CIS chip 312 is also controlled in accordance with the object detection cycle adjusted in accordance with the detection ratio. That is, in the case where the object detection cycle is fast and the CIS chip 312 cannot be driven as fast as the object detection cycle, an imaging cycle control signal is generates so that the imaging cycle is larger than the object detection cycle. Meanwhile, in the case where the CIS chip 312 can be imaged in the same cycle as the object detection cycle, an imaging cycle control signal for matching the imaging cycle with the object detection cycle is generated. The imaging-synchronization-signal generation unit 343 generates an imaging synchronization signal in accordance with the imaging cycle control signal and supplies the generated signal to the CIS chip 12. In the case where control is performed so that the imaging cycle is smaller than the object detection cycle, instead of generating an imaging synchronization signal obtained by simply dividing the cycle of the clock signal to 1/n, an imaging cycle signal obtained by dividing the cycle of the clock signal to 1/n to achieve a video rate of 30 fps, 60 fps, or 120 fps can also be generated.

Therefore, also in the solid-state imaging device 10 according to the third embodiment, an occurrence of an event can be detected in the same detection target range as the imaging range without thinning-out, without a lack of spatial information and with low power consumption, and imaging of the region-of-interest can be performed at high speed. The power consumption can also be reduced by driving only the region-of-interest.

Further, the frame interval (frame volume) can be controlled in accordance with the detection ratio when the object is detected, and the imaging cycle can also be controlled in accordance with the frame interval.

4. Fourth Embodiment

Figure 19:
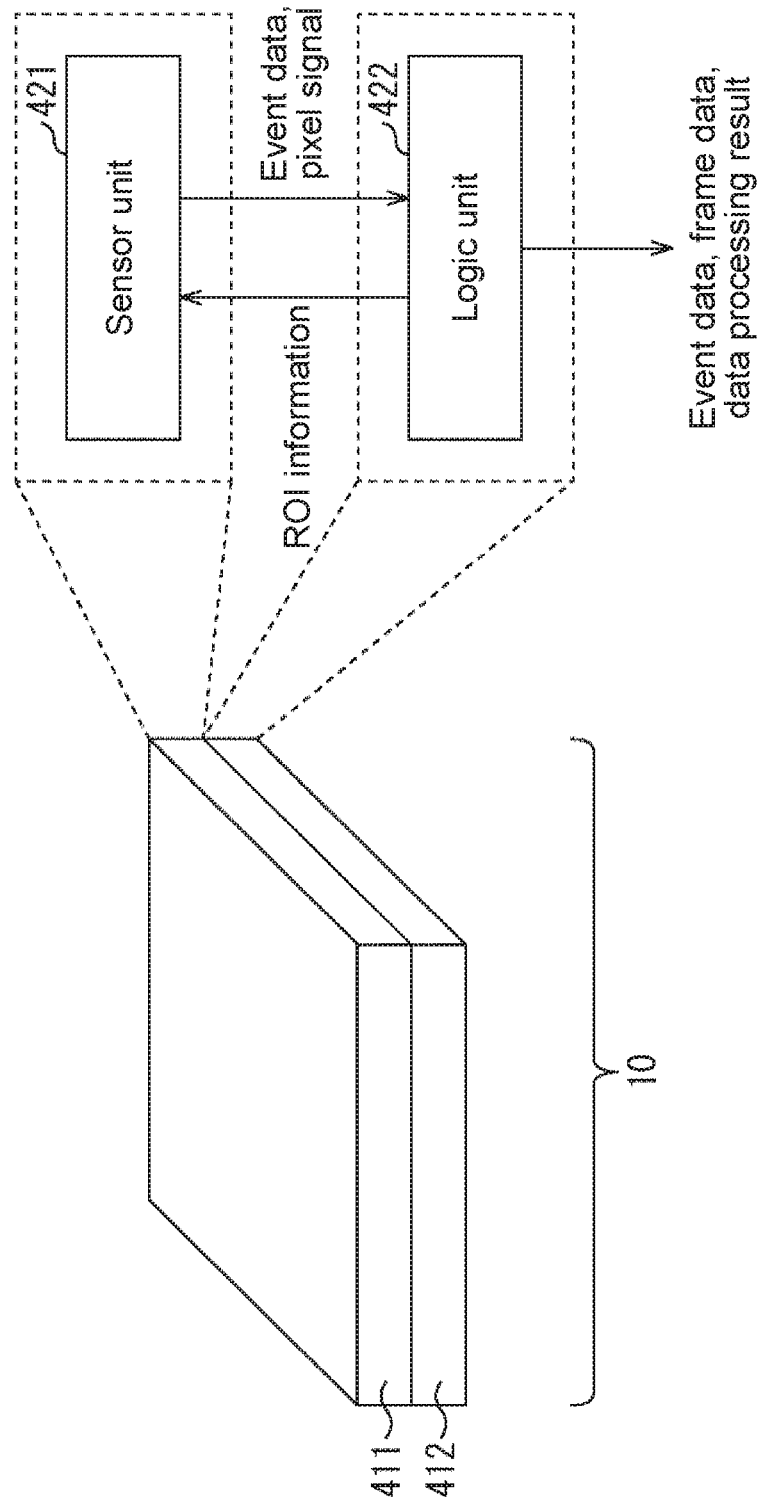
FIG. 19 is a diagram showing a configuration example of a fourth embodiment of a solid-state imaging device to which the present technology is applied.

FIG. 19 is a diagram showing a configuration example of a fourth embodiment of a solid-state imaging device to which the present technology is applied.

In the first to third embodiments described above, a pixel for receiving light for event detection, and a pixel for receiving light for generating an image of a region-of-interest have been formed on separate chips (semiconductor chips). Meanwhile, in the solid-state imaging device 10 according to the fourth embodiment, a pixel for receiving light for event detection and a pixel for receiving light for generating an image of a region-of-interest are formed on the same chip.

The solid-state imaging device 10 in FIG. 19 includes one chip in which a sensor die (board) 411 as a plurality of dies (boards) and a logic die 412 are stacked.

In the sensor die 411, (a circuit as) a sensor unit 421 is formed. In the logic die 412, a logic unit 422 is formed.

The sensor unit 421 generates event data similarly to the pixel array unit 31 (FIG. 2) of the DVS chip 11 described above. That is, the sensor unit 421 includes a pixel that performs photoelectric conversion of incident light to generate an electrical signal, and generates event data representing an occurrence of an event that is a change in the electrical signal of a pixel.

Further, the sensor unit 421 generates a pixel signal similarly to the pixel array unit 211 (FIG. 11) of the CIS chip 12 described above. That is, the sensor unit 421 includes a pixel that performs photoelectric conversion of incident light to generate an electrical signal, performs imaging in synchronization with a vertical synchronization signal, and outputs frame data that is image data in a frame format.

The sensor unit 421 is capable of outputting event data or a pixel signal independently, as well as outputting a pixel signal of a region-of-interest on the basis of ROI information input from the logic unit 422 on the basis of the generated event data.

The logic unit 422 controls the sensor unit 421 as necessary. Further, the logic unit 422 performs, in accordance with the event data from the sensor unit 421, various types of data processing such as data processing for generating frame data, and image processing for frame data from the sensor unit 421 or frame data generated in accordance with the event data from the sensor unit 421, and outputs the event data, the frame data, and the data processing result obtained by performing the various types of data processing.

The logic unit 422 includes, for example, the memory 34, the image processing unit 35, the clock signal generation unit 37, the reliability determination unit 342, the image processing unit 321, and the imaging-synchronization-signal generation unit 343 formed in the DSP chip 313, of the configurations shown in FIG. 17.

Note that regarding the sensor unit 421, a part thereof may be configured in the logic die 412. Further, regarding the logic unit 422, a part thereof can be configured in the sensor die 411.

Figure 20:
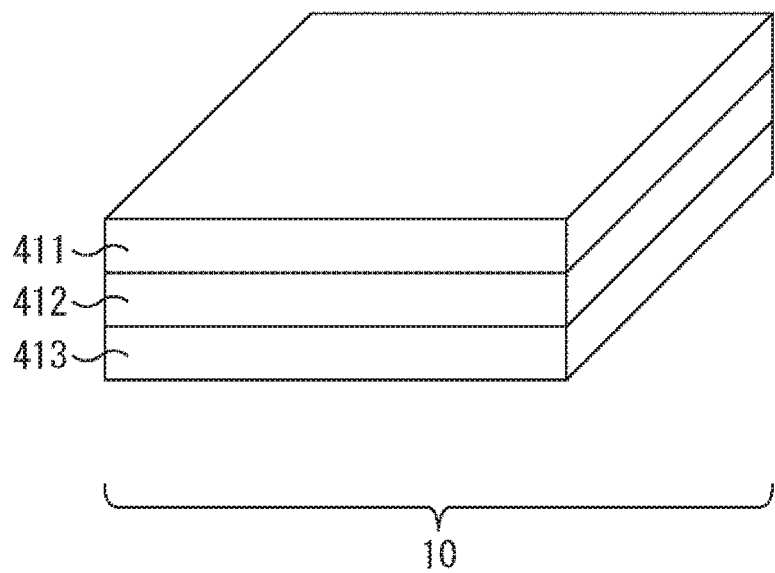
FIG. 20 is a diagram showing another configuration example of the fourth embodiment of the solid-state imaging device to which the present technology is applied.

Further, for example, in the case where a memory having a large capacity is provided as the memory 34 or the memory included in the image processing unit 321, the solid-state imaging device 10 can include three layers in which another logic die 413 is laminated in addition to the sensor die 411 and the logic die 412 as shown in FIG. 20. It goes without saying that the solid-state imaging device 10 can include four or more layers of stacked dies (boards).

<Configuration Example of Sensor Unit 421>

Figure 21:
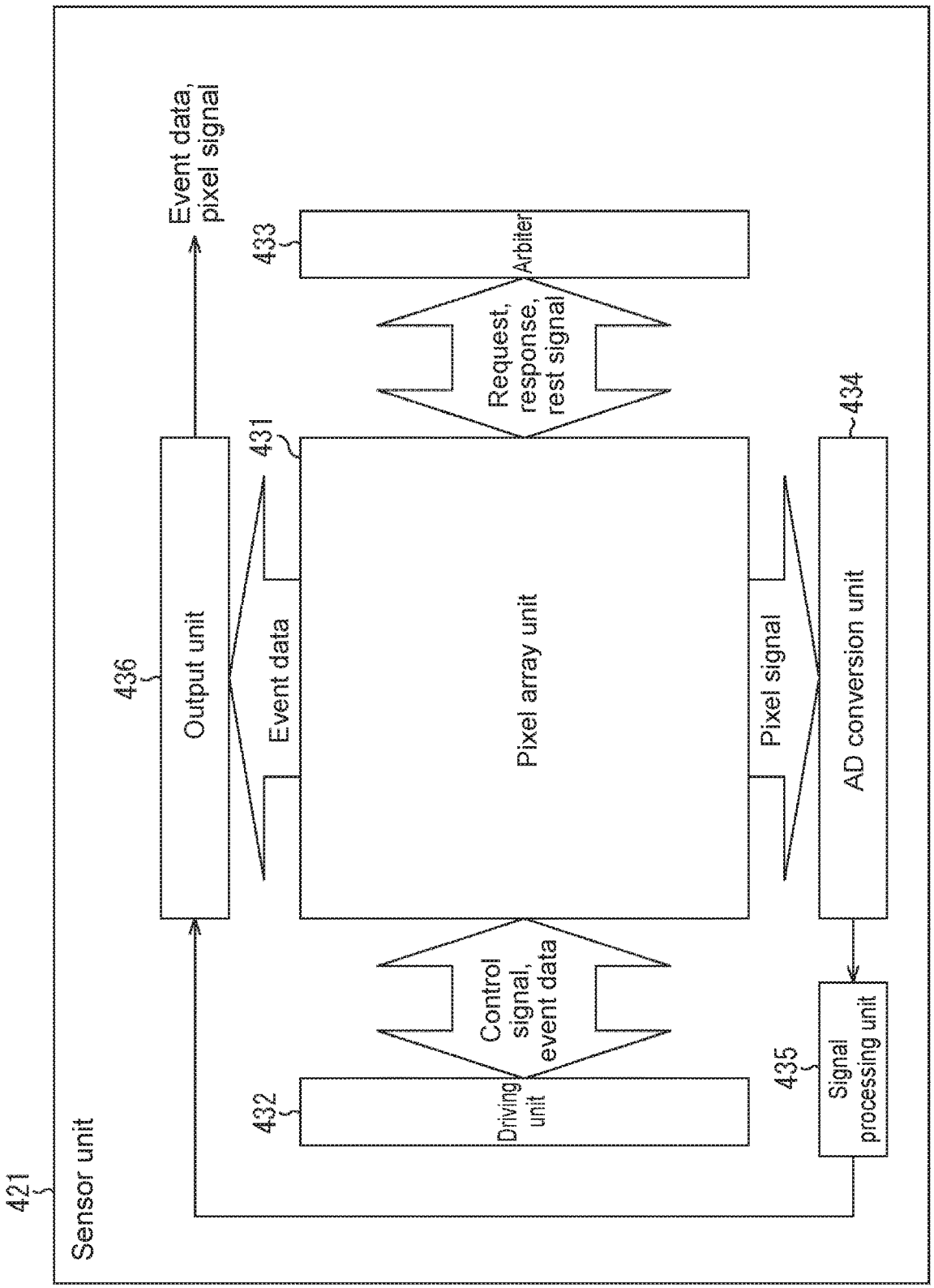
FIG. 21 is a block diagram showing a configuration example of a sensor unit in FIG. 19.

FIG. 21 is a block diagram showing a configuration example of the sensor unit 421 in FIG. 19.

The sensor unit 421 includes a pixel array unit 431, a driving unit 432, a arbiter 433, an AD conversion unit 434, a signal processing unit 435, and an output unit 436.

The pixel array unit 431 includes a plurality of pixels 451 (FIG. 22) arranged in a two-dimensional lattice. The pixel array unit 431 detects, in the case where a change exceeding a predetermined threshold value (including a change equal to or greater than the threshold value as necessary) occurs in (a voltage corresponding to) a photocurrent as an electrical signal generated by photoelectric conversion of the pixel 451, the change in the photocurrent as an event. In the case where the pixel array unit 431 detects an event, the pixel array unit 431 outputs a request for outputting event data representing an occurrence of the event to the arbiter 433. Then, the pixel array unit 431 outputs, in the case of receiving a response representing permission of outputting event data from the arbiter 433, event data to the driving unit 432 and the output unit 436. Further, the pixel array unit 431 outputs an electrical signal of the pixel 451 from which the event has been detected to the AD conversion unit 434 as a pixel signal.

The driving unit 432 drives the pixel array unit 431 by supplying a control signal to the pixel array unit 431. For example, the driving unit 432 drives the pixel 451 from which event data is output from the pixel array unit 431 to supply (output) the pixel signal of the pixel 451 to the AD conversion unit 434.

The arbiter 433 is configured similarly to the arbiter 33 in the third embodiment. That is, the arbiter 433 arbitrates the request for outputting event data from the pixel array unit 431, and returns a response representing whether to permit or not to permit the outputting of event data to the pixel array unit 431. Further, after outputting a response representing permission of outputting event data, the arbiter 433 outputs a reset signal for resetting the event detection to the pixel array unit 431.

The AD conversion unit 434 is configured similarly to the AD conversion unit 213 in the third embodiment. That is, the AD conversion unit 434 AD-converts, in the ADC in each column, the pixel signal of the pixel 451 of a pixel block 441 in the column, and supplies the converted signal to the signal processing unit 435. Note that in the AD conversion unit 434, CDS can be performed as well as AD-conversion of the pixel signal.

The signal processing unit 435 is configured similarly to the signal processing unit 216 in the third embodiment. That is, predetermined signal processing such as black level adjusting processing and gain adjustment processing is performed on the pixel signal sequentially supplied from the AD conversion unit 434, and the processed signal is supplied to the output unit 436.

The output unit 436 performs processing similar to that performed by the output unit 36 and the output unit 217 in the third embodiment. That is, the output unit 436 performs necessary processing on the pixel signal and event data, and supplies them to the logic unit 422 (FIG. 19).

<Configuration Example of Pixel Array Unit 431>

Figure 22:
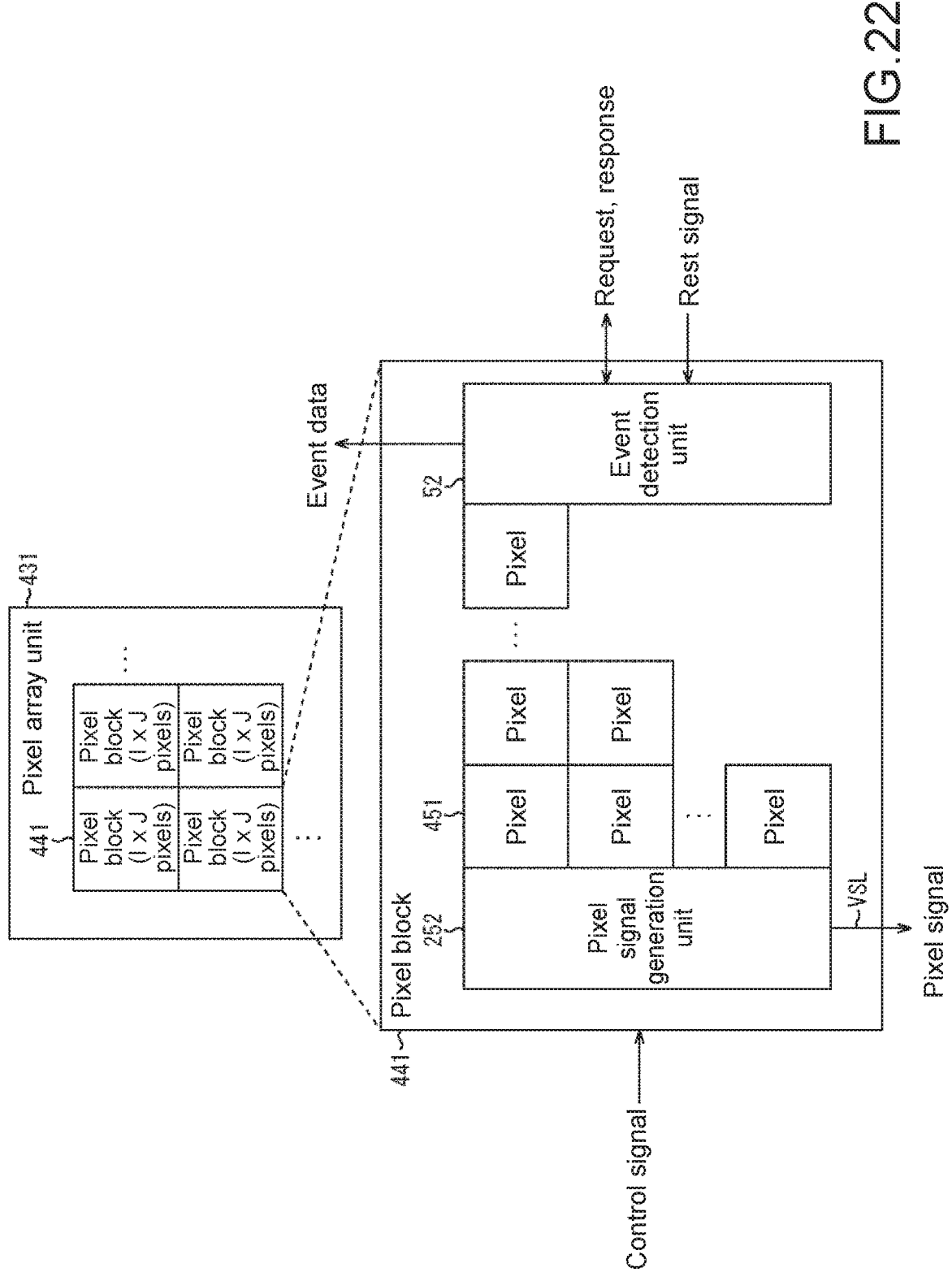
FIG. 22 is a block diagram showing a configuration example of a pixel array unit in FIG. 21.

FIG. 22 is a block diagram showing a configuration example of the pixel array unit 431 in FIG. 21.

Figure 23:
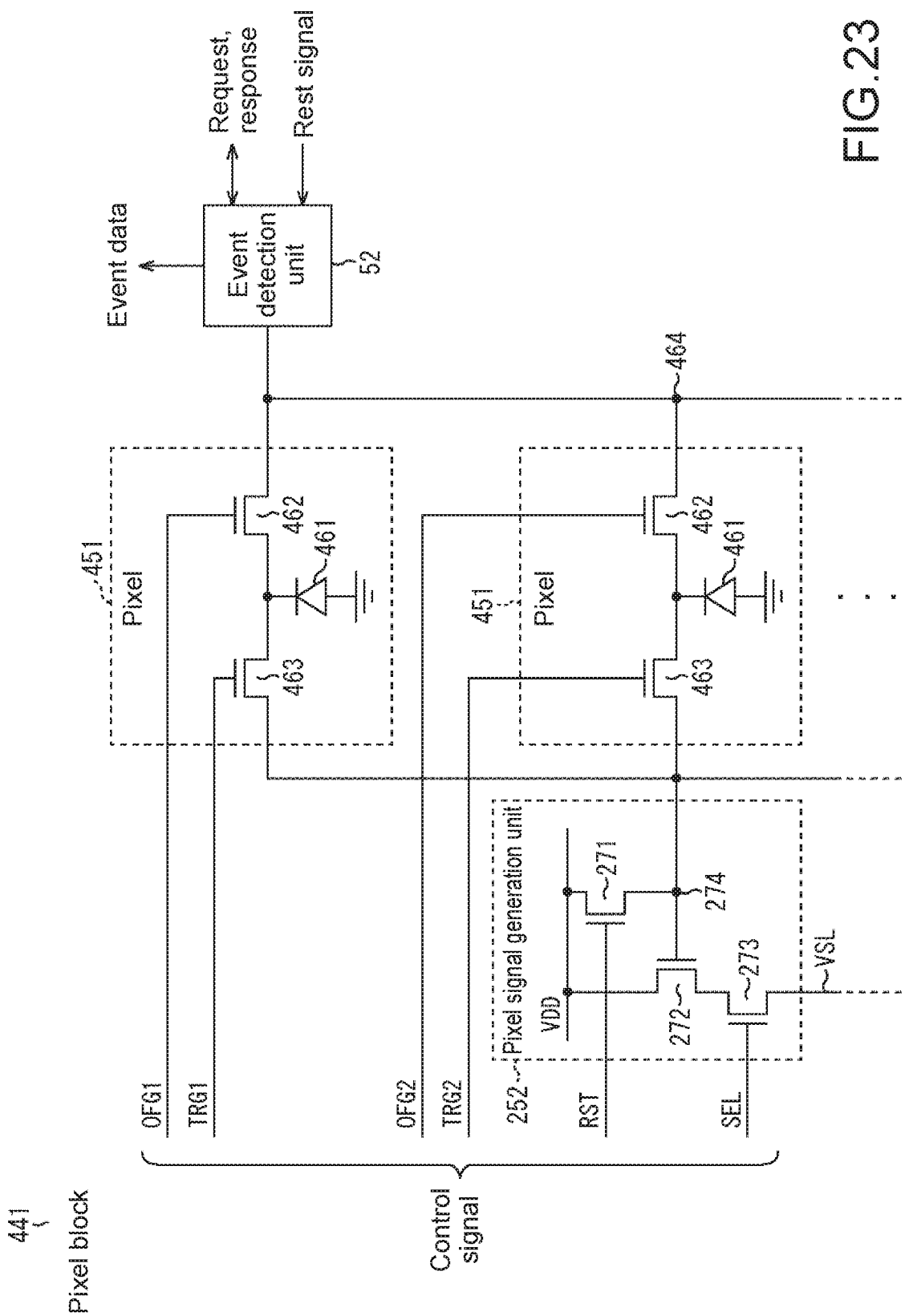
FIG. 23 is a circuit diagram showing a configuration example of the pixel block in FIG. 22.

In FIG. 22 and FIG. 23, components corresponding to those in the above-mentioned first to third embodiments will be denoted by the same reference symbols, and description thereof will be omitted as appropriate.

The pixel array unit 431 includes a plurality of pixel blocks 441. The pixel blocks 441 each include one or more I×J pixels 451 arranged in I rows×J columns (I and J are integers), the event detection unit 52, and the pixel signal generation unit 252.

That is, the pixel array unit 431 includes the pixels 451 different from those in the first to third embodiments, and the same event detection unit 52 and pixel signal generation unit 252 as those in the first to third embodiments.

The pixel 451 receives incident light from an object and photoelectrically converts the received light to generate a photocurrent as an electrical signal. The pixel 451 supplies the photocurrent to the event detection unit 52 under the control of the driving unit 432.

The event detection unit 52 detects, as an event, a change in the photocurrent from each of the pixels 451, which exceeds a predetermined threshold value, under the control of the driving unit 432. In the case where the event detection unit 52 detects an event, the event detection unit 52 supplies a request for outputting event data representing an occurrence of the event to the arbiter 433 (FIG. 21). Then, when the event detection unit 52 receives, from the arbiter 433, a response representing permission of outputting event data in response to the request, the event detection unit 52 outputs event data to the driving unit 432 and the output unit 436.

In the case where an event is detected in the event detection unit 52, the pixel signal generation unit 252 generates a voltage corresponding to a photocurrent of the pixel 451 as a pixel signal under the control of the driving unit 432, and supplies the generated voltage to the AD conversion unit 434 (FIG. 21) via the VSL.

Here, detecting a change exceeding the predetermined threshold value of a photocurrent as an event can be regarded also as detecting, as an event, that there has been no change exceeding the predetermined threshold value of a photocurrent. In the pixel signal generation unit 252, the generation of a pixel signal can be performed in the case where a change exceeding the predetermined threshold value of a photocurrent as an event is detected as well as in the case where it is detected that there has been no change exceeding the predetermined threshold value of a photocurrent as an event.

<Configuration Example of Pixel Block 441>

FIG. 23 is a circuit diagram showing a configuration example of the pixel block 441 in FIG. 22.

As shown in FIG. 22, the pixel block 441 includes the pixels 451, the event detection unit 52, and the pixel signal generation unit 252.

The pixel 451 includes a photoelectric conversion element 461, a transfer transistor 462, and a transfer transistor 463.

The photoelectric conversion element 461 includes, for example, a PD, receives incident light from an object, and photoelectrically converts the received light to generate a photocurrent as an electrical signal.

The transfer transistor 462 includes, for example, an N-type MOS FET. The transfer transistor 462 constituting the n-th pixel 451 of the I×J pixels 451 constituting the pixel block 441 is turned on/off in accordance with a control signal OFGn supplied from the driving unit 432 (FIG. 21). When the transfer transistor 462 is turned on, charges generated in the photoelectric conversion element 461 are transferred (supplied) to the event detection unit 52 as a photocurrent.

The transfer transistor 463 includes, for example, an N-type MOS FET. The transfer transistor 463 constituting the n-th pixel 451 of the I×J pixels 451 constituting the pixel block 441 is turned on/off in accordance with the control signal TRGn supplied from the driving unit 432. When the transfer transistor 463 is turned on, charges generated in the photoelectric conversion element 461 are transferred to the FD 274 of the pixel signal generation unit 252.

The I×J pixels 451 constituting the pixel block 441 are connected to the event detection unit 52 constituting the pixel block 441 via a node 464. Therefore, a photocurrent generated in (the photoelectric conversion element 461 of) the pixel 451 is supplied to the event detection unit 52 via the node 464. As a result, the event detection unit 52 is supplied with the sum of photocurrents of all the pixels 451 in the pixel block 441. Therefore, in the event detection unit 52, a change in the sum of photocurrents supplied from I×J pixels 451 constituting the pixel block 441 is detected as an event.

The pixel signal generation unit 252 includes the reset transistor 271, the amplification transistor 272, the selection transistor 273, and the FD 274, similarly to the case of FIG. 13.

Regarding the pixel 451 and the pixel signal generation unit 252 configured as described above, the driving unit 432 turns on the transfer transistor 462 by the control signal OFGn to supply a photocurrent by the charges generated in the photoelectric conversion element 461 of the pixel 451 to the event detection unit 52. As a result, the event detection unit 52 is supplied with a current that is the sum of photocurrents of all the pixels 451 in the pixel block 441.

In the pixel block 441, when the event detection unit 52 detects a change in (the sum of) photocurrents as an event, the driving unit 432 turns off the transfer transistor 462 of all the pixels 451 in the pixel block 441 to stop supplying of photocurrents to the event detection unit 52. Then, when ROI information is supplied from the logic unit 422 in accordance with event data from the sensor unit 421 after the event is detected, the driving unit 432 drives the pixel 251 of the region-of-interest. That is, the driving unit 432 sets the control signal SEL and the control signal RST to the H level, sequentially selects a pixel row of a region-of-interest, resets the photoelectric conversion element 461, and then starts exposure. After the exposure is completed, the driving unit 432 sequentially turns on the transfer transistor 463 of the pixel 451 in the pixel block 441 of the region-of-interest by the control signal TRGn to transfer the charges generated by the photoelectric conversion element 461 to the FD 274. In the FD 274, charges transferred from (the photoelectric conversion element 461 of) the pixel 451 are accumulated. The voltage corresponding to the charges accumulated in the FD 274 is output to the VSL via the amplification transistor 272 and the selection transistor 273 as a pixel signal of the pixel 451.

As described above, in the sensor unit 421 (FIG. 19), an event is detected by the one or more pixels 451 and the event detection unit 52, and event data is generated. The generated event data is supplied to the logic unit 422, and a region-of-interest is determined. Then, ROI information of the region-of-interest is then supplied from the logic unit 422 to the sensor unit 421, and a pixel signal of the pixel 451 of the pixel block 441 corresponding to the region-of-interest is generated and sequentially output to the VSL. The pixel signal output to the VSL is supplied to the AD conversion unit 434 and AD-converted. The processing of the solid-state imaging device 10 according to the fourth embodiment can be executed in a manner similar to the processing in FIG. 18.

Here, for each of the pixels 451 in the pixel block 441, the transfer transistor 463 can be turned on at the same time instead of being turned on sequentially. In this case, the sum of pixel signals of all the pixel 451 in the pixel block 441 can be output.

In the pixel array unit 431 in FIG. 22, the pixel block 441 includes one or more pixels 451, and the event detection unit 52 and the pixel signal generation unit 252 are shared by the one or more pixels 451. More specifically, the event detection unit 52 and the pixel signal generation unit 252 are shared by the photoelectric conversion element 461, the transfer transistor 462, and the transfer transistor 463 of each of the pixels 451 constituting the pixel block 441. Therefore, in the case where the pixel block 441 includes the plurality of pixels 451, the numbers of the event detection units 52 and the pixel signal generation units 252 can be reduced and the size of the pixel array unit 431 can be suppressed as compared with the case of providing one event detection unit 52 and one pixel signal generation unit 252 for one pixel 451.

Note that in the case where the pixel block 441 includes the plurality of pixels 451, the event detection unit 52 can be provided for each of the pixels 451. Although an event is detected in units of the pixel blocks 441 in the case where the event detection units 52 are shared by the plurality of pixels 451 of the pixel block 441, an event can be detected in units of the pixels 451 in the case where the event detection unit 52 is provided for each of the pixels 451.

However, even in the case where one event detection unit 52 is shared by the plurality of pixels 451 of the pixel block 441, an event can be detected in units of the pixels 451 by temporarily turning on the transfer transistor 462 of each of the plurality of pixels 451 in a time division manner.

<Event Detection and Imaging Operation>

Figure 24:
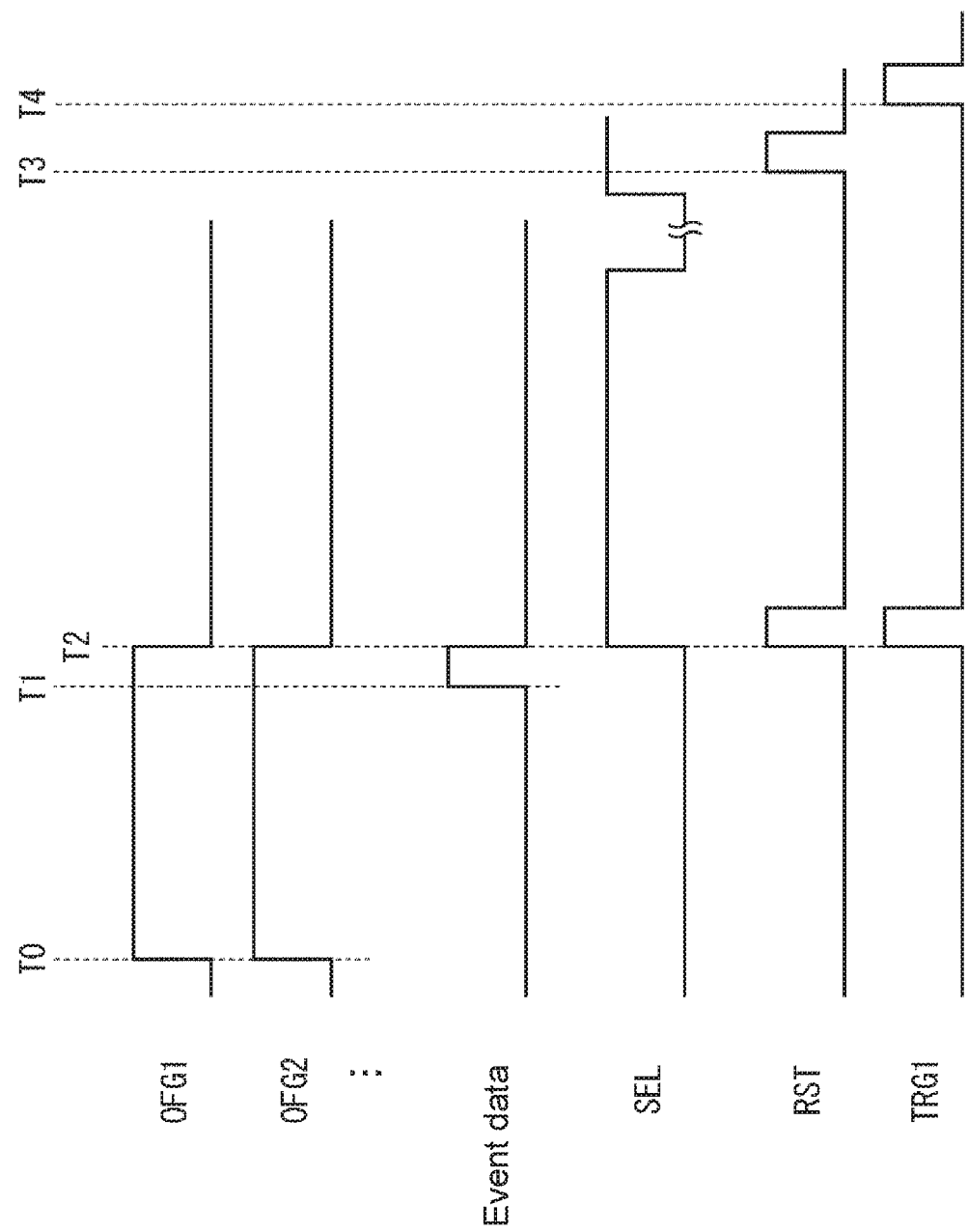
FIG. 24 is a timing chart describing an example of an operation of the sensor unit in FIG. 21.

FIG. 24 is a timing chart describing an example of the operation of the sensor unit 421 in FIG. 21.

At a timing T0, the driving unit 432 sets all the control signals OFGn from the L level to the H level and turns on the transfer transistors 462 of all the pixels 451 in the pixel block 441. Thus, the sum of photocurrents of all the pixels 451 in the pixel block 441 is supplied to the event detection unit 52. At this time, all the control signals TRGn are the L level, and the transfer transistors 463 of all the pixels 451 are off.

For example, at a timing T1, when the event detection unit 52 detects an event, the event detection unit 52 outputs event data of the H level in response to detection of the event.

In accordance with the event data of the H level, the driving unit 432 sets all the control signals OFGn to the L level at a timing T2 to stop supplying of the photocurrent from the pixel 451 to the event detection unit 52. The driving unit 432 then drives the pixel 451 of the region-of-interest to produce a pixel signal. That is, the driving unit 432 sets the control signal SEL of the pixel 451 of the region-of-interest to the H level, sets the control signal RST and the control signal TRG to the H level for a certain period, and discharges charges of the photoelectric conversion element 461 to the power source VDD, thereby performing resetting prior to the start of exposure. After the exposure is completed, the driving unit 432 sets the control signal RST to the H level at a timing T3 to reset the FD 274. The pixel signal generation unit 252 outputs a pixel signal corresponding to the voltage of the FD 274 at the time of resetting the FD 274 as a reset level, and the AD conversion unit 434 AD-converts the reset level.

At a timing T4 after AD-conversion of the reset-level, the driving unit 432 sets the control signal TRG1 to the H level for a certain period to transfer the charges generated by the photoelectric conversion of (the photoelectric conversion element 461 of) the first pixel 451 in the pixel block 441 of the region-of-interest to the FD 274. The pixel signal generation unit 252 outputs a pixel signal corresponding to the voltage of the FD 274 to which charges have been transferred from the pixel 451 as a signal level, and the AD conversion unit 434 AD-converts the signal level.

The AD conversion unit 434 outputs the difference between the AD-converted signal level and the reset level to the signal processing unit 435 as a pixel signal that is a pixel value of an image (frame data).

After AD-converting the pixel signal of the first pixel 451 in the pixel block 441 of the region-of-interest, the driving unit 432 sequentially sets the control signal RST and the control signal TRG2 to the H level for a predetermined period similarly to the timings T3 and T4 to output the pixel signal of the second pixel 451 in the pixel block 441 of the region-of-interest.

In the sensor unit 421, a similar operation is performed thereafter, and a pixel signal of each of the pixels 451 in the pixel block 441 of the region-of-interest is sequentially outputted.

When pixel signals of all the pixels 451 in the pixel block 441 are output, the driving unit 432 sets all the control signals OFGn to the H level and turns on the transfer transistors 462 of all the pixels 451 in all the pixel blocks 441 of the pixel array unit 431.

As described above, in the sensor unit 421, event detection and exposure (light reception) for imaging are performed in a light division manner in one pixel 451.

Figure 25:
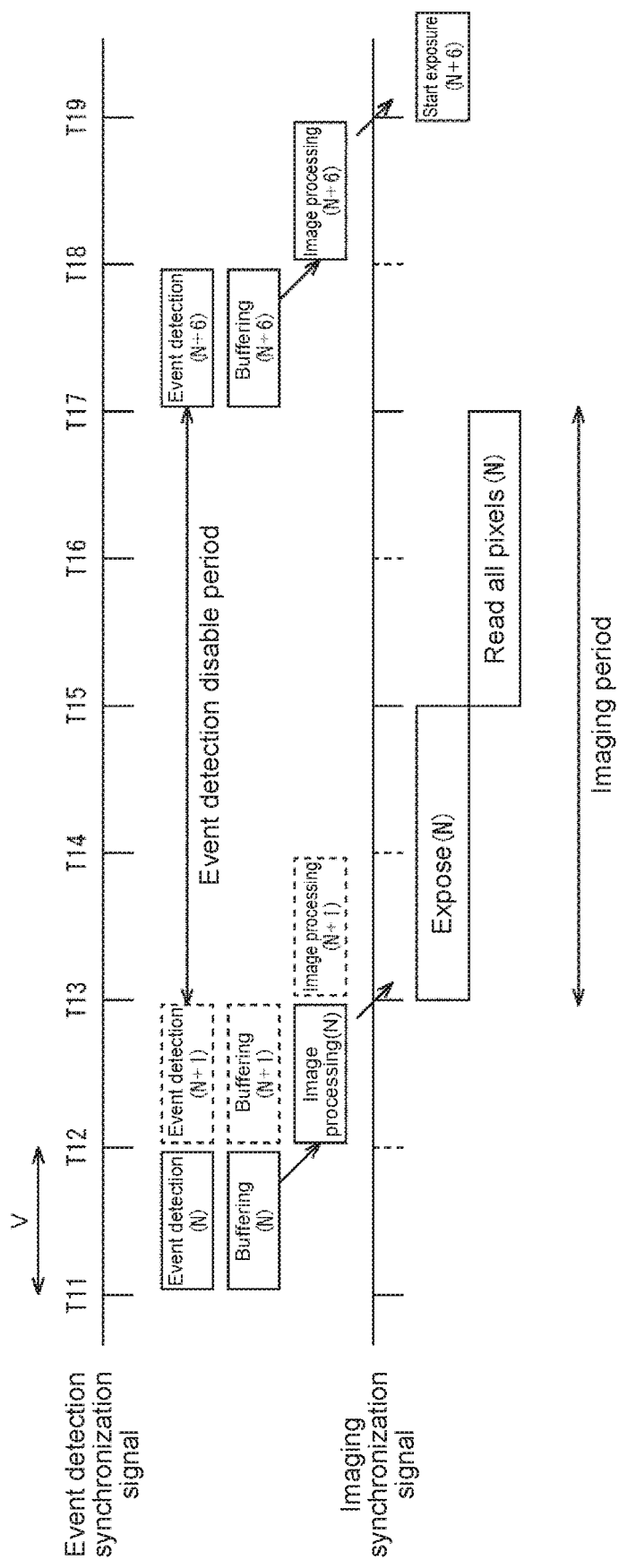
FIG. 25 is a timing chart showing driving in the case where imaging is performed by all pixels of the pixel array unit.

FIG. 25 is a timing chart showing driving of the pixel array unit 431 in the case where imaging is performed by all pixels of the pixel array unit 431.

In the case of performing imaging in all the pixels of the pixel array unit 431, the amount of data for imaging is larger that for event detection, so that the time taken for the imaging is longer than the time taken for the event detection.

For example, assumption is made that the clock signal generated by the clock signal generation unit 37 is used as an event detection synchronization signal, event detection, buffering to the memory 34, and image processing (object detection processing) by the image processing unit 35 are performed in a V period, and exposure and pixel reading are performed in a 2V period in accordance with the imaging synchronization signal obtained by dividing the event detection synchronization signal to ½. The event detection and the buffering to the memory 34 can be executed in the single V period by pipelining.

In this case, since the shared photoelectric conversion element 461 is used for event detection and exposure for imaging, the period during which exposure for imaging and pixel reading are performed, specifically, a 4V period from a timing T13 to a timing T17 in FIG. 25 is at least an event detection disable period in which event detection is not possible.

Figure 26:
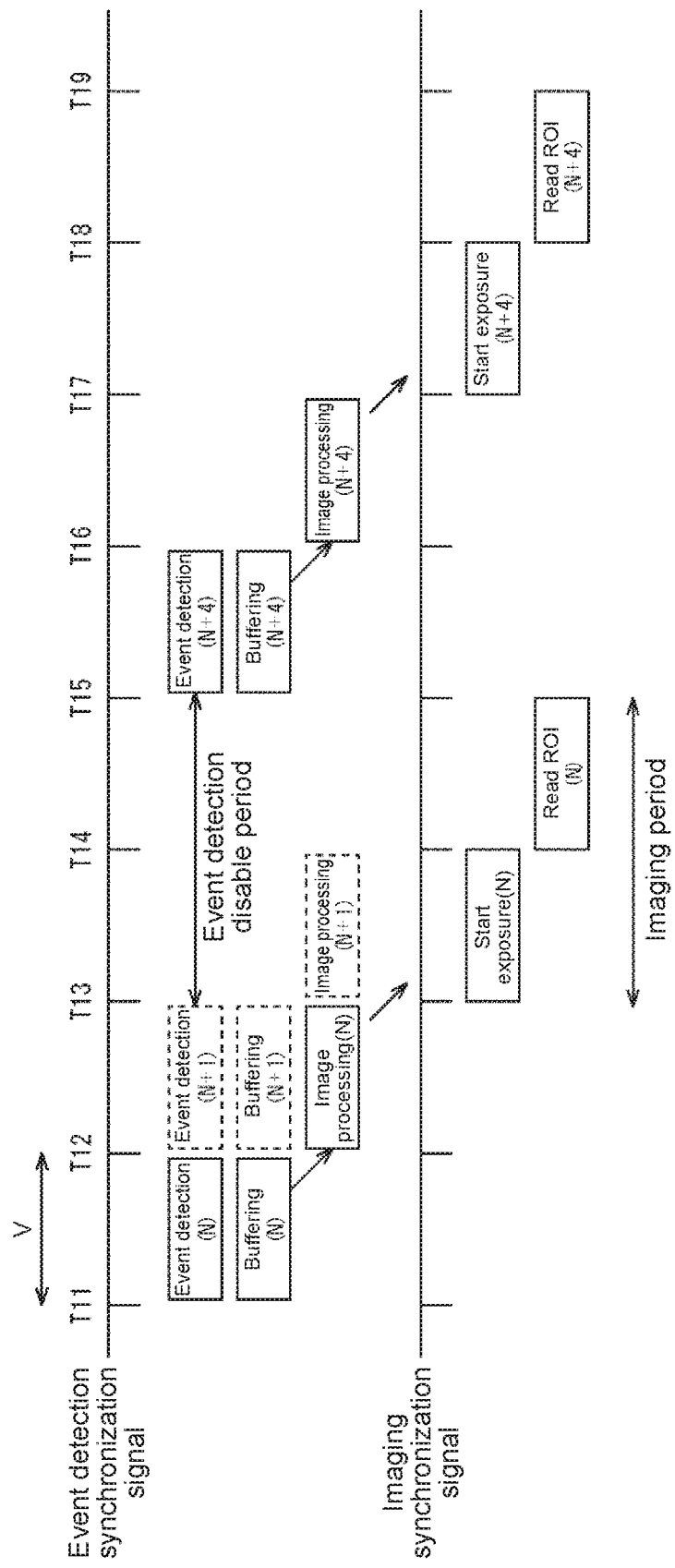
FIG. 26 is a timing chart showing driving in the case where imaging of a region-of-interest is performed in the pixel array unit.

FIG. 26 is a timing chart showing driving of the pixel array unit 431 in the case where imaging of a region-of-interest is performed in the pixel array unit 431.

Meanwhile, in the case where a region-of-interest is specified by ROI information and the region-of-interest is imaged, since the region is limited, the amount of data can be reduced, so that the imaging cycle can be made the same as the event detection cycle, for example. That is, as shown in FIG. 26, exposure and pixel reading can be performed in the V period. As a result, the event detection disable period becomes a 2V period from the timing T13 to a timing T15, and the event detection disable period can be shortened. The example of FIG. 26 is an example in which the imaging cycle is the same as the event detection cycle, for example. However, even in the case where the imaging cycle is not the same as the event detection period, the event detection disable period can be shortened by performing imaging on only the region-of-interest as compared with the case where imaging is performed in all the pixels.

<Another Configuration Example of Pixel Array Unit 431>

Figure 27:
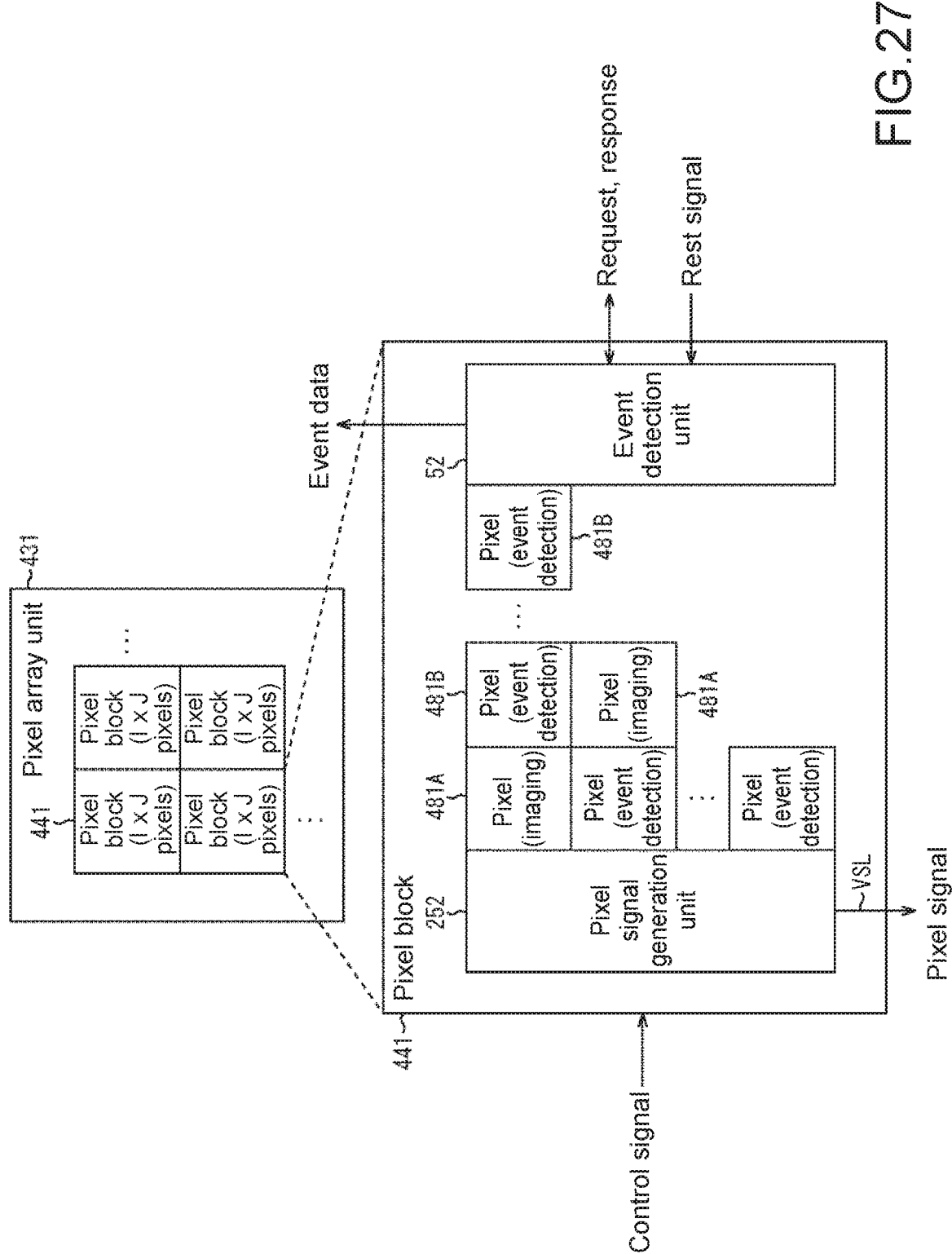
FIG. 27 is a block diagram showing another configuration example of the pixel array unit in FIG. 21.

FIG. 27 is a block diagram showing another configuration example of the pixel array unit 431 in FIG. 21.

The pixel array unit 431 in FIG. 27 is different from the pixel array unit 431 in FIG. 22 in that two types of pixels 481 of a pixel 481A and a pixel 481B are arranged in I rows and J columns (I and J are integers) in one pixel block 441, and is otherwise the same as the pixel array unit 431 in FIG. 22.

In the pixel array unit 431 in FIG. 22, the pixels 451 capable of performing both event detection and imaging (in a time division manner) are arranged in I rows and J columns (I and J are integers).

Meanwhile, in the pixel array unit 431 in FIG. 27, the pixel 481A and the pixel 481B are alternately arranged in the row direction and the column direction, and are mixed. Similarly to the pixel 251 in FIG. 13, the pixel 481A is a pixel for generating a pixel signal for imaging, which is configured by connecting the pixel signal generation unit 252 to a photoelectric conversion element. Similarly to the pixel 51 in FIG. 4, the pixel 481B is a pixel for performing event detection, which is configured by connecting the event detection unit 52 to photoelectric conversion element. Since the pixel 481A for generating a pixel signal for imaging and the pixel 481B for performing event detection include the photoelectric conversion element 461 individually and do not share the photoelectric conversion element 461, imaging and event detection can be performed simultaneously.

As described above, even in the case where the solid-state imaging device 10 includes one chip, imaging and event detection can be performed simultaneously with a configuration in which the pixel 481A for performing imaging and the pixel 481B for performing event detection are mixed in one pixel block 441.

Note that FIG. 27 shows a configuration in which the plurality of pixels 481 constituting one pixel block 441 is divided into the pixel 481A for generating a pixel signal for imaging and the pixel 481B for performing event detection. However, the plurality of pixels 481 can be divided into the pixel block 441 for generating a pixel signal for imaging and the pixel block 441 for performing event detection in units of the pixel blocks 441. Also in this case, imaging and event detection can be performed simultaneously.

In accordance with the above-mentioned solid-state imaging device 10, also in the case where the chip that performs event detection and the chip that images a region-of-interest are different chips or the same chip, a region-of-interest is determined by identifying the object to be detected when an occurrence of an event is detected, a pixel signal of each of the pixels of the region-of-interest is generated, and an image of the region-of-interest is generated. Therefore, the result of detecting the occurrence of an event by the asynchronous image sensor can be utilized for imaging by the synchronous image sensor.

<5. Application Example to Electronic Apparatus>

The present technology is not limited to application to solid-state imaging devices. That is, the present technology can be applied to the general electronic apparatus in which a solid-state imaging device is used as the image capturing unit (photoelectric conversion unit), such as imaging devices including a digital still camera and a video camera, a portable terminal device having an imaging function, and a copiers that uses a solid-state imaging device in the image reading unit. The solid-state imaging device may be formed as a one-chip, or may be a modular form having an imaging function in which an imaging unit and a signal processing unit or an optical system are packaged together.

Figure 28:
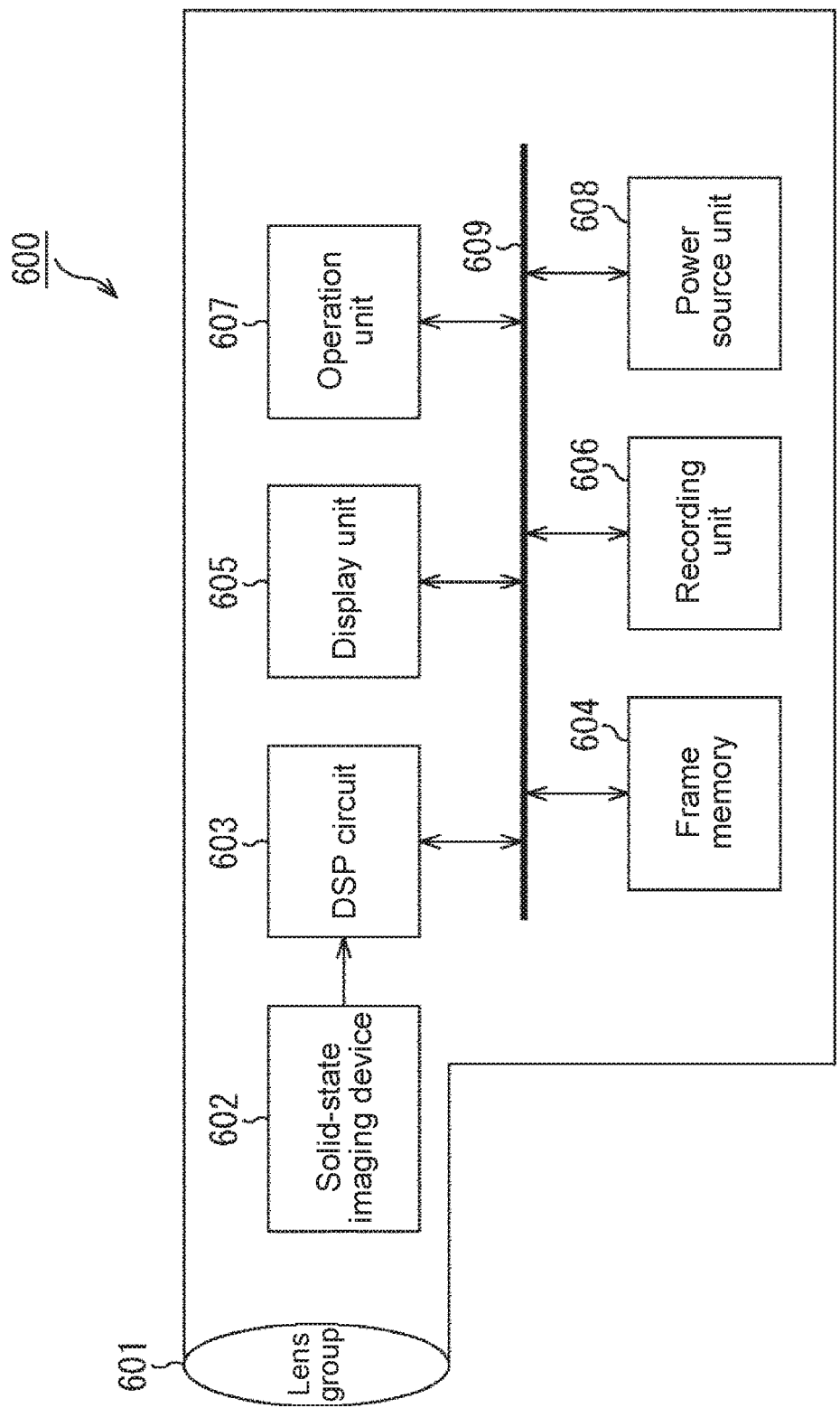
FIG. 28 is a block diagram showing a configuration example of an imaging device serving as an electronic apparatus to which the present technology is applied.

FIG. 28 is a block diagram showing a configuration example of an imaging device serving as an electronic apparatus to which the present technology is applied.

An imaging device 600 in FIG. 28 includes an optical unit 601 including a lens group and the like, a solid-state imaging device (imaging device) 602 in which the configuration of the solid-state imaging device 10 is employed, and a DSP (Digital Signal Processor) circuit 603 that is a camera signal processing circuit. Further, the imaging device 600 also includes a frame memory 604, a display unit 605, a recording unit 606, an operation unit 607, and a power source unit 608. The DSP circuit 603, the frame memory 604, the display unit 605, the recording unit 606, the operation unit 607, and the power source unit 608 are connected to each other via a bus line 609.

The optical unit 601 captures incident light (image light) from an object and forms an image on an imaging surface of the solid-state imaging device 602. The solid-state imaging device 602 converts the light amount of incident light imaged on the imaging surface by the optical unit 601 into an electrical signal in units of pixels, and outputs the converted light amount as a pixel signal. As this solid-state imaging device 602, the above-mentioned solid-state imaging device 10, i.e., a solid-state imaging device in which a region-of-interest is determined by detecting an occurrence of an event and imaging of the region-of-interest is performed, can be used.

The display unit 605 includes, for example, a thin display such as an LCD (Liquid Crystal Display) and an organic EL (Electro Luminescence) display, and displays a moving image or a still image captured by the solid-state imaging device 602. The recording unit 606 records the moving image or the still image captured by the solid-state imaging device 602 on a recording medium such as a hard disk and a semi-conductor memory.

The operation unit 607 issues an operation command for various functions the imaging device 600 has under the operation by a user. The power source unit 608 appropriately supplies various types of power to be the operation power of the DSP circuit 603, the frame memory 604, the display unit 605, the recording unit 606, and the operation unit 607, to these supply targets.

As described above, by using, as the solid-state imaging device 602, the solid-state imaging device 10 to which any of the above-mentioned embodiments is applied, an occurrence of an event can be detected with low power consumption without a lack of spatial information for the imaging region, and imaging of the region-of-interest determined on the basis of the detected event can be performed at high speed. Therefore, even in the imaging device 600 such as a video camera, a digital still camera, and a camera module for mobile devices such as mobile phones, it is possible to perform imaging of the desired region-of-interest at high speed with low power consumption.

<Usage Example of Image Sensor>

Figure 29:
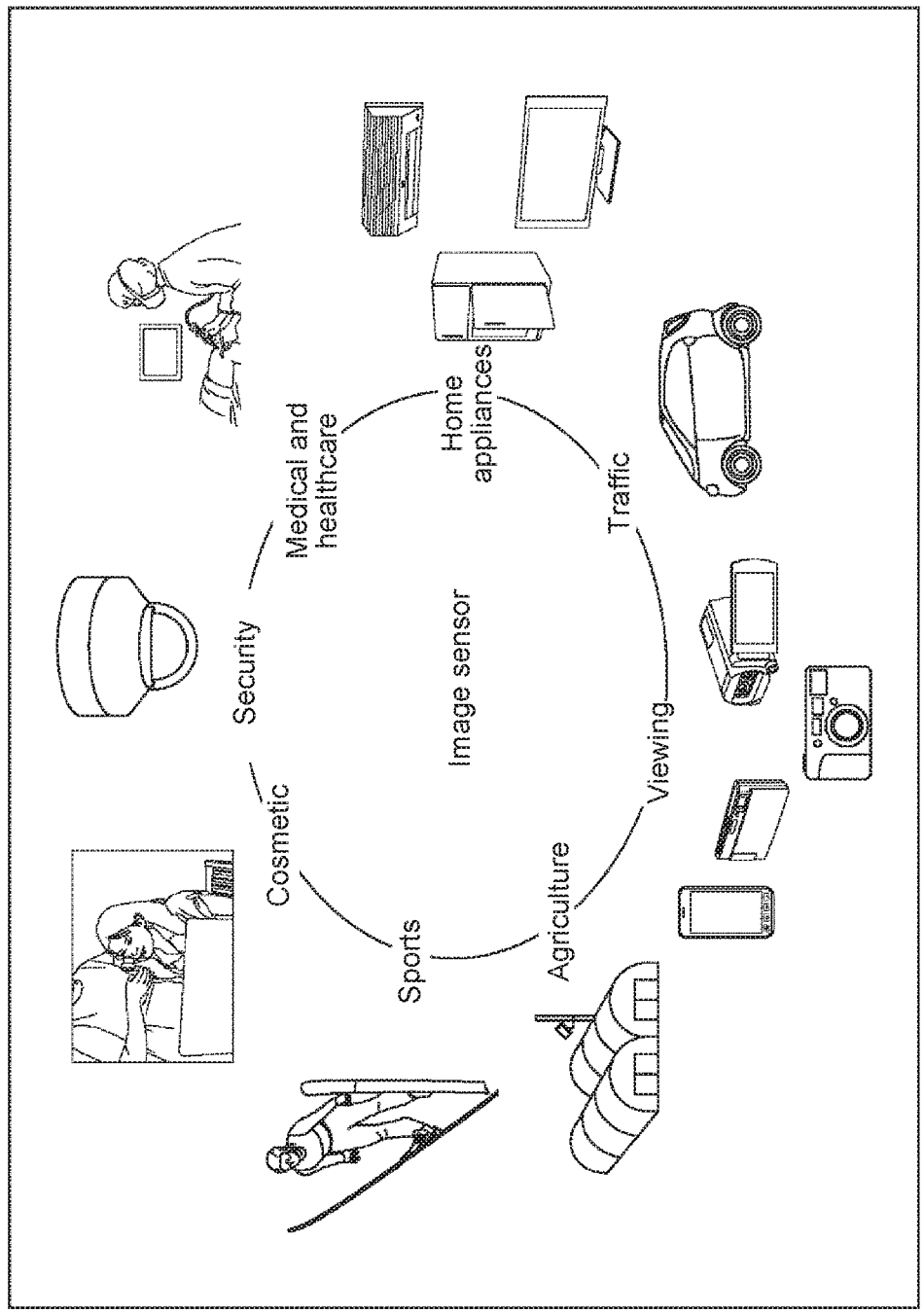
FIG. 29 is a diagram showing a usage example of an image sensor.

FIG. 29 is a diagram showing an exemplary use of an image sensor using the above-mentioned solid-state imaging device 10.

An image sensor using the above-mentioned solid-state imaging device 10 can be used in various cases of sensing light such as visible light, infrared light, ultraviolet light, and X-rays, for example, as described below.

Apparatus for capturing images used for viewing, such as a digital camera and a portable device with a camera function Apparatus used for traffic purposes such as an in-vehicle sensor for imaging the front, rear, surrounding, and interior of automobiles for safe driving such as automatic stopping or for recognizing the state of drivers, etc, a monitoring camera for monitoring traveling vehicles and roads, and range-finding sensor for range-finding between vehicles, etc.

Apparatus used in home appliances such as a TV, a refrigerator, and an air conditioner to image the gestures of users and perform device operations in accordance with the gestures Apparatus used for medical and healthcare purposes, such as an endoscope and a device that performs angiography by receiving infrared light Apparatus used for security purposes, such as a monitoring camera for security purposes and a camera for personal identification purposes Apparatus used for cosmetic purposes, such as a measuring apparatus for imaging skin and a microscope for imaging scalp Apparatus used for sports purposes, such as an action camera for sports purposes and a wearable camera Apparatus used for agricultural purposes, such as a camera for monitoring the states of fields and crops 6. Application Example to Moving Objects>

The technology according to the present disclosure (the present technology) is applicable to various products. For example, the technology according to the present disclosure may be realized as an apparatus mounted on any type of moving objects such as an automobile, an electric car, a hybrid electric vehicle, a motorcycle, a bicycle, personal mobility, an airplane, a drone, a ship, and a robot.

Figure 30:
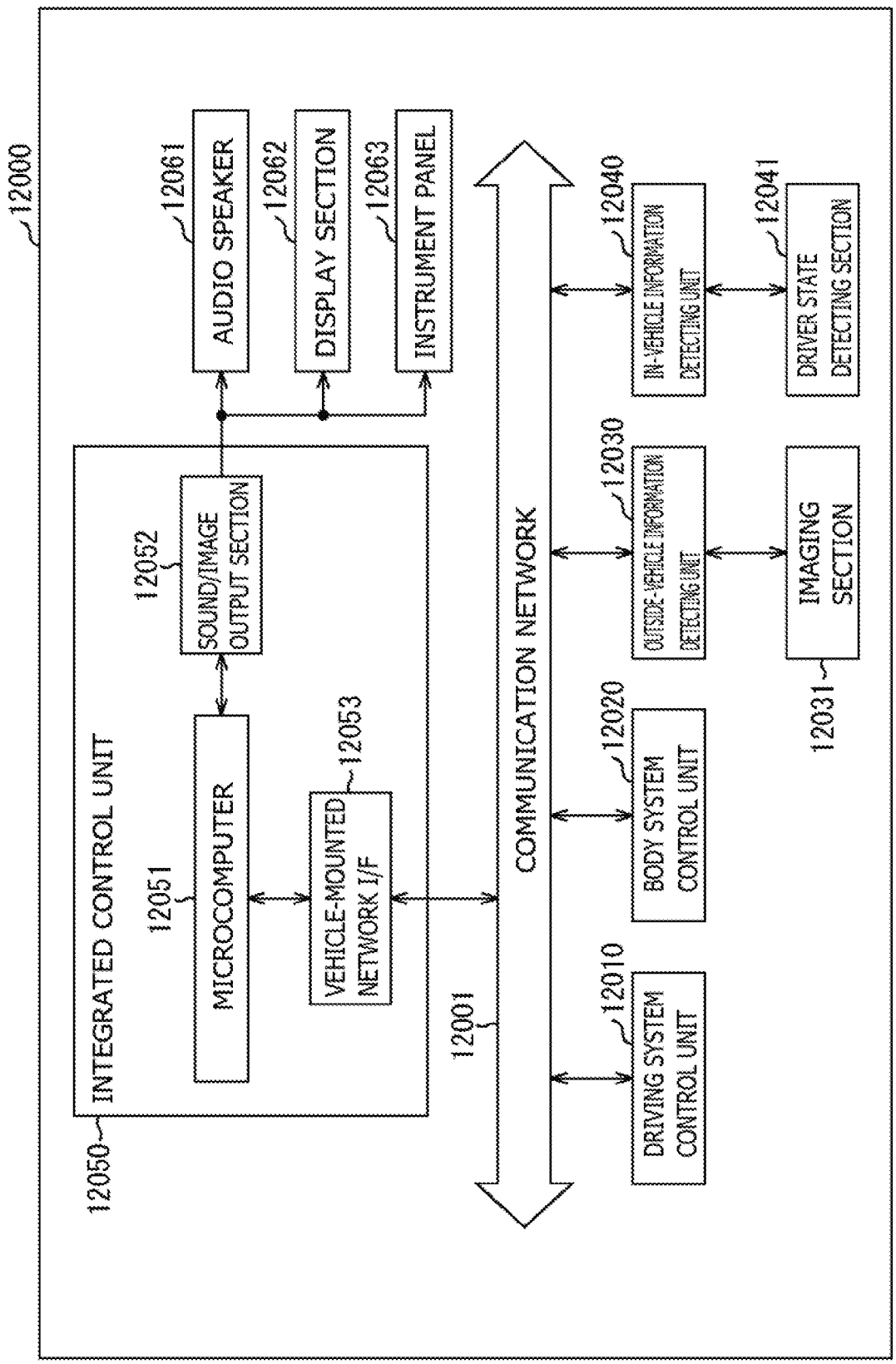
FIG. 30 is a block diagram depicting an example of schematic configuration of a vehicle control system.

FIG. 30 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 30, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 30, an audio speaker 12061, a display section 12062, and an instrument panel 12063 are illustrated as the output device. The display section 12062 may, for example, include at least one of an on-board display and a head-up display.

Figure 31:
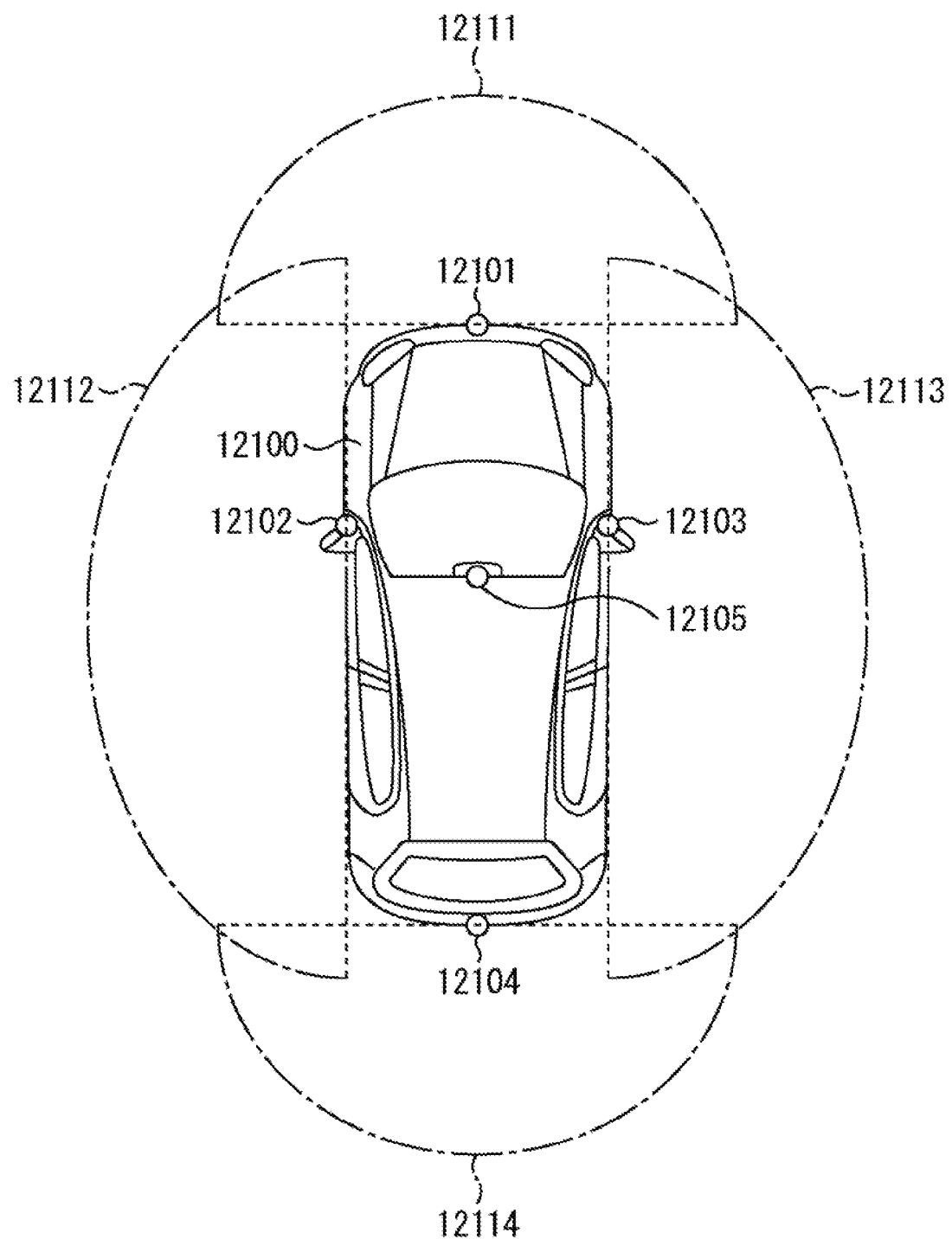
FIG. 31 is a diagram of assistance in explaining an example of installation positions of an outside-vehicle information detecting section and an imaging section.

FIG. 31 is a diagram depicting an example of the installation position of the imaging section 12031.

In FIG. 31, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The images of the front obtained by the imaging section 12101 and the imaging section 12105 are used mainly to detect a preceding vehicle, a pedestrian, an obstacle, a signal, a traffic sign, a lane, or the like.

Incidentally, FIG. 31 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of a vehicle control system to which the technology according to the present disclosure can be applied has been described above. The technology according to the present disclosure can be applied to the imaging section 12031 among the configurations described above. Specifically, the above-mentioned solid-state imaging device 10 can be applied as the imaging section 12031. By applying the technology according to the present disclosure to the imaging section 12031, it is possible to perform appropriate driving support by performing imaging of a region-of-interest determined by detecting an occurrence of an event with low power consumption at high speed without a lack of spatial information with respect to an imaging range.

Embodiments of the present technology are not limited to the above-mentioned embodiments, and various modifications can be made without departing from the essence of the present technology.

Note that the effects described herein are merely illustrative and not restrictive, and other effects than those described herein may be exerted.

It should be noted that the present technology may take the following configurations.

(1) A solid-state imaging device, including:
an event detection unit that detects, as an event, a change in an electrical signal generated by each pixel of a pixel array unit;
a region-of-interest detection unit that detects, from a result of detecting the event, a region-of-interest of the pixel array unit; and a pixel signal generation unit that generates a pixel signal constituting an image of a region corresponding to the region-of-interest.

(2) The solid-state imaging device according to (1) above, further including
a memory that accumulates the event occurred in each pixel of the pixel array unit in frame units, in which
the region-of-interest detection unit detects a region-of-interest of the pixel array unit from event data in the frame units.

(3) The solid-state imaging device according to (2) above, in which
the region-of-interest detection unit identifies an object to be detected from the event data in the frame units, and detects a region including the object as the region-of-interest.

(4) The solid-state imaging device according to (3) above, further including
a reliability determination unit that determines reliability of object detection by a detection ratio of the object and controls the frame units.

(5) The solid-state imaging device according to (4) above, in which
the reliability determination unit further controls an imaging cycle of the pixel signal generation unit in accordance with the frame units.

(6) The solid-state imaging device according to any one of (3) to (5) above, further including
an imaging-synchronization-signal generation unit that generates an imaging synchronization signal for making an imaging cycle of the pixel signal generation unit the same as a detection cycle of the object.

(7) The solid-state imaging device according to any one of (1) to (6) above, further including
an imaging-synchronization-signal generation unit that generates an imaging synchronization signal for making an imaging cycle of the pixel signal generation unit a video rate.

(8) The solid-state imaging device according to any one of (1) to (7) above, in which
the event detection unit and the pixel signal generation unit are formed in different chips.

(9) The solid-state imaging device according to any one of (1) to (7) above, in which
the event detection unit, the region-of-interest detection unit, and the pixel signal generation unit are formed in different chips.

(10) The solid-state imaging device according to (8) above, in which
the pixel signal generation unit generates the pixel signal of a region of the pixel array unit of the chip of the pixel signal generation unit, the region corresponding to the region-of-interest of the chip of the event detection unit.

(11) The solid-state imaging device according to any one of (1) to (7) above, in which
the event detection unit and the pixel signal generation unit are formed in the same chip.

(12) The solid-state imaging device according to (11) above, in which
a photoelectric conversion element of each pixel of the pixel array unit is shared by the event detection unit and the pixel signal generation unit.

(13) The solid-state imaging device according to (11) above, in which
a pixel that outputs an electrical signal of a photoelectric conversion element to the event detection unit and a pixel that outputs the electrical signal of the photoelectric conversion element to the pixel signal generation unit are mixed in the pixel array unit.

(14) A signal processing chip, including:
a region-of-interest detection unit that detects, from a result of detecting, as an event, a change in an electrical signal generated by each pixel of a pixel array unit, a region-of-interest of the pixel array unit, and outputs ROI information for identifying the region-of-interest; and
an image processing unit that acquires a pixel signal of the region-of-interest and generates an image.

(15) An electronic apparatus, including:
a solid-state imaging device including
an event detection unit that detects, as an event, a change in an electrical signal generated by each pixel of a pixel array unit,
a region-of-interest detection unit that detects, from a result of detecting the event, a region-of-interest of the pixel array unit, and
a pixel signal generation unit that generates a pixel signal constituting an image of a region corresponding to the region-of-interest.

REFERENCE SIGNS LIST 10 solid-state imaging device
11 first chip (DVS chip)
12 second chip (CIS chip)
31 pixel array unit
34 memory
35 image processing unit
37 clock signal generation unit
41 pixel block
51 pixel
52 event detection unit
61 photoelectric conversion element
131 frame interval setting unit
132 frame width setting unit
133 detection unit
211 pixel array unit
216 signal processing unit
241 pixel block
251 pixel
252 pixel signal generation unit
261 photoelectric conversion element
311 first chip (DVS chip)
312 second chip (CIS chip)
313 third chip (DSP chip)
321 an image processing unit
341 detection unit
342 reliability determination unit
343 imaging-synchronization-signal generation unit
411 sensor die
412, 413 logic die
431 pixel array unit
435 signal processing unit
441 pixel block
451 pixel
461 photoelectric conversion element
481 (481A, 481B) pixel
600 imaging device
602 solid-state imaging device

The invention claimed is:

1. A solid-state imaging device, comprising:
an event detection circuit configured to detect, as an event, a change in an electrical signal generated by each pixel of a pixel array unit;
a processor configured to detect, from a result of detecting the event, a region-of-interest of the pixel array unit;
a pixel signal generation circuit that generates a pixel signal constituting an image of a region corresponding to the region-of-interest; and
a memory that accumulates the event occurred in each pixel of the pixel array unit in frame units, wherein
the processor is configured to detect the region-of-interest of the pixel array unit from event data in the frame units, to identify an object to be detected from the event data in the frame units, to detect a region including the object as the region-of-interest, and to determine reliability of object detection by a detection ratio of the object and control the frame units.

2. The solid-state imaging device according to claim 1, wherein
the processor is configured to control an imaging cycle of the pixel signal generation circuit in accordance with the frame units.

3. The solid-state imaging device according to claim 1, further comprising
an imaging-synchronization-signal generation circuit configured to generate an imaging synchronization signal for making an imaging cycle of the pixel signal generation circuit the same as a detection cycle of the object.

4. The solid-state imaging device according to claim 1, further comprising
an imaging-synchronization-signal generation circuit configured to generate an imaging synchronization signal for making an imaging cycle of the pixel signal generation circuit a video rate.

5. The solid-state imaging device according to claim 1, wherein
the event detection circuit and the pixel signal generation circuit reside in different chips.

6. The solid-state imaging device according to claim 5, wherein
the pixel signal generation circuit generates the pixel signal of a region of the pixel array unit of the chip of the pixel signal generation circuit, the region corresponding to the region-of-interest of the chip of the event detection circuit.

7. The solid-state imaging device according to claim 1, wherein
the event detection circuit, the processor, and the pixel signal generation circuit reside in different chips.

8. The solid-state imaging device according to claim 1, wherein
the event detection circuit and the pixel signal generation circuit reside in the same chip.

9. The solid-state imaging device according to claim 1, wherein
a photoelectric conversion element of each pixel of the pixel array unit is shared by the event detection circuit and the pixel signal generation circuit.

10. The solid-state imaging device according to claim 1, wherein
each pixel of the pixel array unit includes a pixel for detecting the event or a pixel for generating the pixel signal.

11. An electronic apparatus, comprising:
a solid-state imaging device including
an event detection circuit configured to detect, as an event, a change in an electrical signal generated by each pixel of a pixel array unit,
a processor configured to detect, from a result of detecting the event, a region-of-interest of the pixel array unit,
a pixel signal generation circuit configured to generate a pixel signal constituting an image of a region corresponding to the region-of-interest, and
a memory that accumulates the event occurred in each pixel of the pixel array unit in frame units, wherein
the processor is configured to detect the region-of-interest of the pixel array unit from event data in the frame units, to identify an object to be detected from the event data in the frame units, detect a region including the object as the region-of-interest, and to determine reliability of object detection by a detection ratio of the object and control the frame units.

12. The electronic apparatus according to claim 11, wherein the processor is configured to control an imaging cycle of the pixel signal generation circuit in accordance with the frame units.

13. The electronic apparatus according to claim 11, further comprising:
an imaging-synchronization-signal generation circuit configured to generate an imaging synchronization signal for making an imaging cycle of the pixel signal generation circuit the same as a detection cycle of the object.

* * * * *